US012691996B2

(12) United States Patent　　　　(10) Patent No.:　US 12,691,996 B2

Beizaee et al.　　　　　　　　　　　 (45) Date of Patent:　　Jul. 28, 2026

---

(54) FLAP DRIVE MECHANISM

(71) Applicant: Odys Aviation, Inc., Long Beach, CA (US)

(72) Inventors: Shahriyar Beizaee, Long Beach, CA (US); Campbell McLaren, Long Beach, CA (US); Luke Maraffi, Long Beach, CA (US)

(73) Assignee: Odys Aviation, Inc., Long Beach, CA (US)

( * ) Notice: Subject to any disclaimer, the term of this patent is extended or adjusted under 35 U.S.C. 154(b) by 0 days.

(21) Appl. No.: 19/087,076

(22) Filed: Mar. 21, 2025

(65) Prior Publication Data

US 2025/0296676 A1　　　Sep. 25, 2025

Related U.S. Application Data

(60) Provisional application No. 63/568,853, filed on Mar. 22, 2024.

(51) Int. Cl.
　B64C 9/20　　　　(2006.01)
　B64C 13/28　　　 (2006.01)

(52) U.S. Cl.
　CPC .............. B64C 9/20 (2013.01); B64C 13/28 (2013.01)

(58) Field of Classification Search
　CPC .. B64C 9/20; B64C 13/28; B64C 9/16; B64C 9/26; Y02T 50/30
　See application file for complete search history.

(56) References Cited

U.S. PATENT DOCUMENTS

| | | | | |
|---|---|---|---|---|
| 2,404,956 A | * | 7/1946 | Gouge ...................... | B64C 9/20 244/216 |
| 3,767,140 A | * | 10/1973 | Johnson ................... | B64C 9/20 244/216 |
| 3,853,289 A | * | 12/1974 | Nevermann .............. | B64C 9/20 244/215 |
| 3,874,617 A | * | 4/1975 | Johnson ................... | B64C 9/16 244/216 |

(Continued)

OTHER PUBLICATIONS

"The 5 Types of Flaps Explained" Pilot Institute, online available at <https://pilotinstimte.com/flaps-types-explained/>, retrieved on Jun. 26, 2023.

(Continued)

*Primary Examiner* — Medhat Badawi

(74) *Attorney, Agent, or Firm* — Patterson + Sheridan, LLP; Gero G. McClellan

(57)　　　　　　ABSTRACT

A flap drive mechanism for moving an actuating flap of an aircraft is provided. In one aspect, a flap drive mechanism includes a base mount, links, an actuator, a first track having a first rail, a second track pivotably coupled with the first track and having a second rail, a third track pivotably coupled with the second track and having a third rail. The second and third tracks and a mounting link each provide a flap segment mount. The actuator is coupled with the base mount and arranged to drive the links so that the first rail translates relative to the base mount, the second track pivots relative to the first track while a bearing coupled with the third track slides relative to the second rail, and the third track pivots relative to the second track while a bearing coupled with the mounting link slides relative to the third track.

20 Claims, 13 Drawing Sheets

(56) References Cited

U.S. PATENT DOCUMENTS

| | | | | |
|---|---|---|---|---|
| 3,985,319 | A * | 10/1976 | Dean | B64C 9/16 244/216 |
| 4,301,980 | A * | 11/1981 | Bradfield | B64C 29/0066 244/55 |
| 4,353,517 | A * | 10/1982 | Rudolph | B64C 9/20 244/216 |
| 4,605,187 | A * | 8/1986 | Stephenson | B64C 9/04 244/216 |
| 4,767,083 | A * | 8/1988 | Koenig | B64C 21/025 244/12.3 |
| 4,784,355 | A * | 11/1988 | Brine | B64C 9/16 244/216 |
| 5,161,757 | A * | 11/1992 | Large | B64C 9/16 244/216 |
| 6,464,176 | B2 * | 10/2002 | Uchida | B64C 13/30 244/99.3 |
| 7,264,206 | B2 * | 9/2007 | Wheaton | B64C 9/24 244/210 |
| 7,270,305 | B2 * | 9/2007 | Rampton | B64C 9/22 244/214 |
| 11,001,371 | B2 * | 5/2021 | Bowers | B64C 9/04 |
| 11,548,616 | B1 * | 1/2023 | Hung | B64C 3/58 |
| 11,597,509 | B1 * | 3/2023 | Alfaro | B64C 29/0025 |
| 11,820,490 | B1 * | 11/2023 | Tsai | B64C 9/02 |
| 12,280,868 | B2 * | 4/2025 | Mikic | B64D 37/04 |
| 12,358,610 | B1 * | 7/2025 | Block | B64C 13/28 |
| 2006/0000952 | A1 * | 1/2006 | Rampton | B64C 9/22 244/214 |
| 2011/0127387 | A1 * | 6/2011 | Morris | B64C 9/26 244/216 |
| 2015/0166170 | A1 * | 6/2015 | Gemilang | B64C 9/16 244/215 |
| 2016/0176507 | A1 * | 6/2016 | Fevergeon | B64C 9/02 244/99.3 |
| 2016/0176508 | A1 * | 6/2016 | Fevergeon | B64C 9/16 244/99.3 |
| 2018/0009523 | A1 * | 1/2018 | Elliott | B64C 13/12 |
| 2019/0031317 | A1 * | 1/2019 | Tsai | B64C 7/00 |
| 2019/0084666 | A1 * | 3/2019 | Bentivoglio | B64C 13/28 |
| 2019/0092454 | A1 * | 3/2019 | Mortland | B64C 13/28 |
| 2019/0152581 | A1 * | 5/2019 | Davis | B64C 9/02 |

| | | | | |
|---|---|---|---|---|
| 2020/0079497 | A1 * | 3/2020 | Huynh | B64C 13/505 |
| 2020/0130808 | A1 * | 4/2020 | Sarraf | B64C 13/28 |
| 2020/0290723 | A1 * | 9/2020 | Tsai | B64C 9/16 |
| 2020/0331589 | A1 * | 10/2020 | Cummings | B64D 27/32 |
| 2021/0276694 | A1 * | 9/2021 | Bowers | B64C 13/341 |
| 2022/0212782 | A1 * | 7/2022 | Huynh | B64C 9/20 |
| 2022/0227480 | A1 * | 7/2022 | Westermeier | B64C 13/30 |
| 2022/0227481 | A1 * | 7/2022 | Potier | B64C 9/16 |
| 2023/0026241 | A1 * | 1/2023 | Edmunds | B64C 9/14 |
| 2023/0132705 | A1 * | 5/2023 | Foskey | B64C 9/16 244/215 |
| 2023/0271696 | A1 * | 8/2023 | Andreani | B64C 9/16 244/99.3 |
| 2023/0303237 | A1 * | 9/2023 | Block | B64C 9/04 |
| 2023/0348041 | A1 * | 11/2023 | Schlipf | B64C 9/20 |
| 2023/0365249 | A1 * | 11/2023 | Tsai | B64C 9/06 |
| 2023/0406482 | A1 * | 12/2023 | Everaert | B64C 9/16 |
| 2024/0002038 | A1 * | 1/2024 | Tsai | B64C 9/26 |
| 2024/0034458 | A1 * | 2/2024 | Schlipf | B64C 9/18 |
| 2024/0035551 | A1 * | 2/2024 | Pluchon | F16H 25/205 |
| 2024/0278905 | A1 * | 8/2024 | Block | B64C 9/16 |
| 2024/0367773 | A1 * | 11/2024 | Block | B64C 9/02 |
| 2024/0417066 | A1 * | 12/2024 | Family | B64C 9/16 |
| 2025/0010985 | A1 * | 1/2025 | Mikic | B64D 27/357 |
| 2025/0019062 | A1 * | 1/2025 | Schlipf | B64C 9/22 |
| 2025/0019063 | A1 * | 1/2025 | Schlipf | B64C 9/02 |
| 2025/0019066 | A1 * | 1/2025 | Hollands | B60T 1/062 |
| 2025/0033763 | A1 * | 1/2025 | Teyssier | F16D 43/208 |
| 2025/0042535 | A1 * | 2/2025 | Block | B64C 9/16 |
| 2025/0042540 | A1 * | 2/2025 | Hollands | B64C 13/28 |
| 2025/0083796 | A1 * | 3/2025 | Sakurai | B64C 9/16 |
| 2025/0171137 | A1 * | 5/2025 | Mikic | B64C 29/00 |
| 2025/0187718 | A1 * | 6/2025 | Wydock | B64C 9/34 |
| 2025/0206441 | A1 * | 6/2025 | Chaussivert | B64C 13/28 |
| 2025/0249999 | A1 * | 8/2025 | Everaert | B64C 9/02 |
| 2025/0296676 | A1 * | 9/2025 | Beizaee | B64C 9/20 |

OTHER PUBLICATIONS

International Search Report and Written Opinion received for PCT Patent Application No. PCT/US2025/020973, mailed on Jun. 5, 2025, 11 pages.

* cited by examiner

400

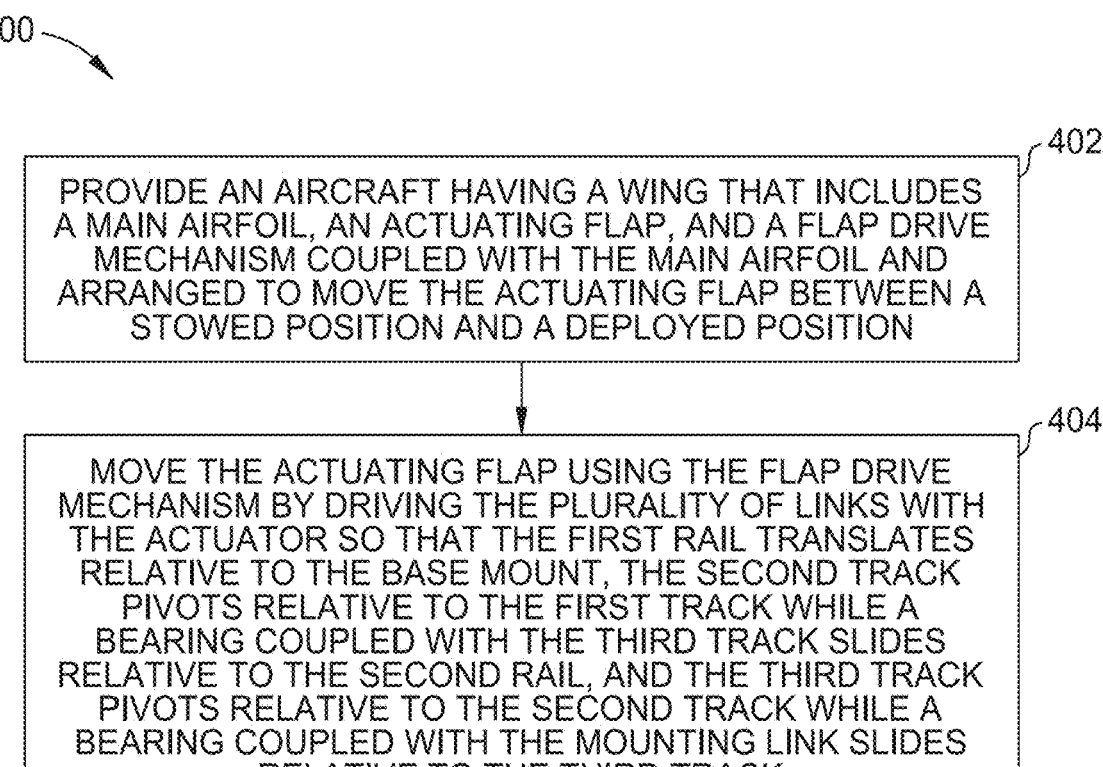

402

PROVIDE AN AIRCRAFT HAVING A WING THAT INCLUDES A MAIN AIRFOIL, AN ACTUATING FLAP, AND A FLAP DRIVE MECHANISM COUPLED WITH THE MAIN AIRFOIL AND ARRANGED TO MOVE THE ACTUATING FLAP BETWEEN A STOWED POSITION AND A DEPLOYED POSITION

404

MOVE THE ACTUATING FLAP USING THE FLAP DRIVE MECHANISM BY DRIVING THE PLURALITY OF LINKS WITH THE ACTUATOR SO THAT THE FIRST RAIL TRANSLATES RELATIVE TO THE BASE MOUNT, THE SECOND TRACK PIVOTS RELATIVE TO THE FIRST TRACK WHILE A BEARING COUPLED WITH THE THIRD TRACK SLIDES RELATIVE TO THE SECOND RAIL, AND THE THIRD TRACK PIVOTS RELATIVE TO THE SECOND TRACK WHILE A BEARING COUPLED WITH THE MOUNTING LINK SLIDES RELATIVE TO THE THIRD TRACK

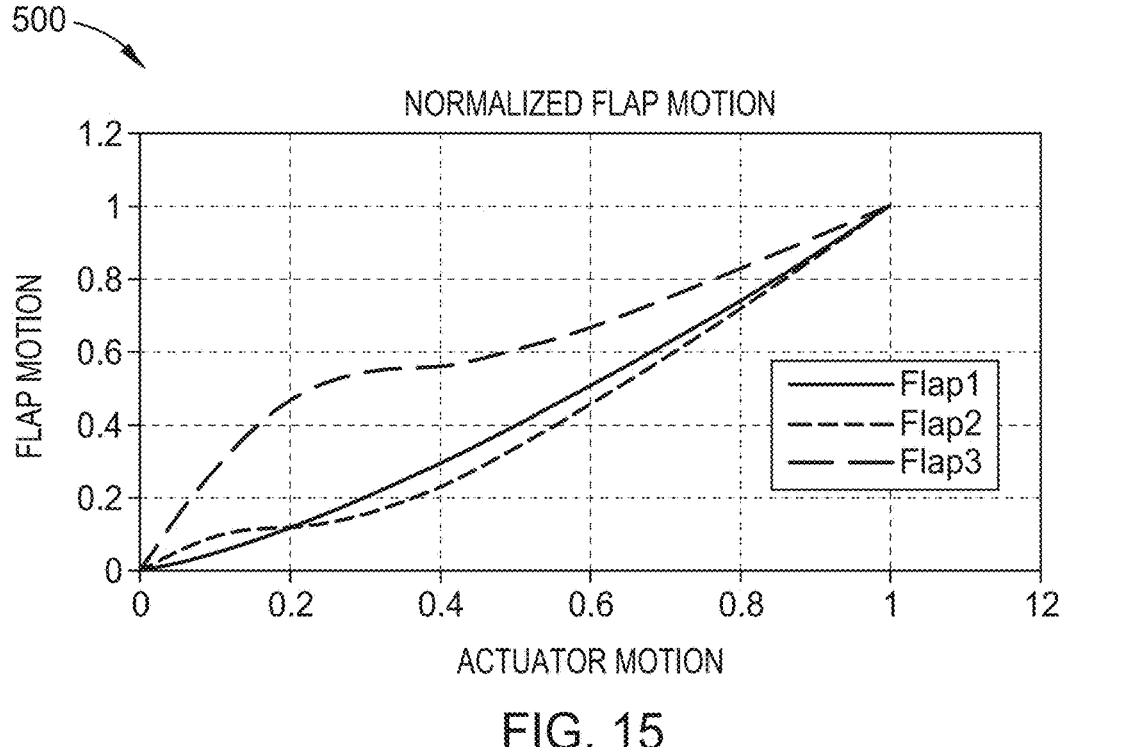

FIG. 15

FLAP DRIVE MECHANISM

CROSS-REFERENCE TO RELATED APPLICATIONS

This application claims benefit of co-pending U.S. provisional patent application Ser. No. 63/568,853 filed Mar. 22, 2024. The aforementioned related patent application is herein incorporated by reference in its entirety.

TECHNICAL FIELD

Embodiments presented in this disclosure generally relate to aircraft, and more particularly, to a flap drive mechanism for moving an actuating flap of an aircraft.

BACKGROUND

Some fixed-wing vertical takeoff and landing (VTOL) aircraft can operate in a vertical flight mode for takeoff and landings and in a horizontal flight mode for cruising. Hover mode can also be implemented. Transitioning between flight modes and stabilizing such VTOL aircraft during hover mode and vertical flight has presented certain challenges.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 14 is a flow diagram for a method for moving an actuating flap with a flap drive mechanism according to one or more aspects of the present disclosure.

FIG. 15 is a graph depicting flap motion of three flap segments of an actuating flap as a function of actuator motion according to one or more aspects of the present disclosure.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 1:
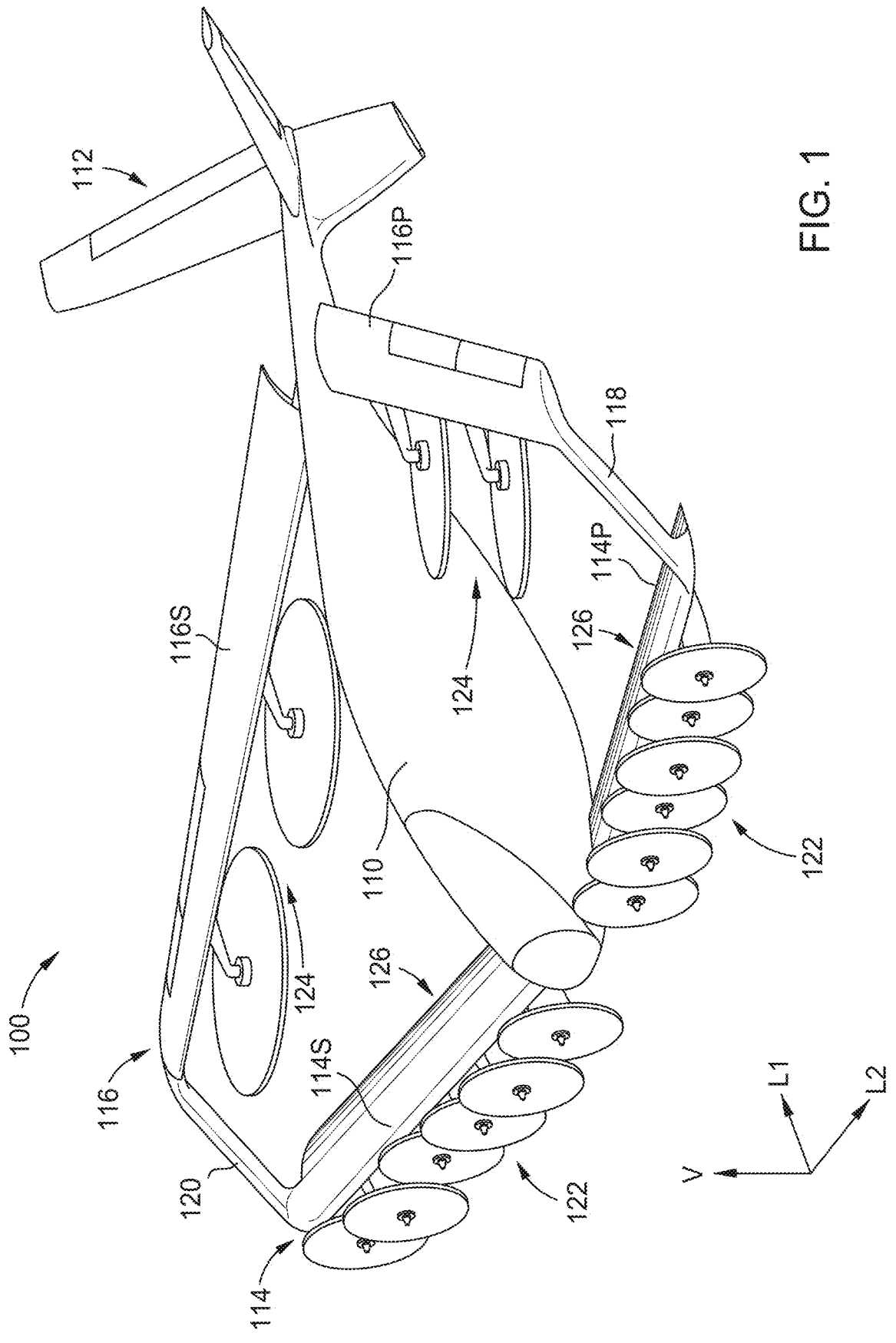
FIG. 1 is a perspective view of an aircraft according to one or more aspects of the present disclosure.

Disclosed herein are novel flap drive mechanisms arranged to move an actuating flap of an aircraft, e.g., between a stowed position and a deployed position, as well as positions therebetween. In at least one example aspect, a wing of an aircraft can include a main airfoil and an actuating flap arranged at an aft side of the main airfoil. The actuating flap can include a plurality of flap segments that can be moved by one or more flap drive mechanisms. When the actuating flap is in the stowed position, the flap segments can be retracted into a compact arrangement relative to each other and to the main airfoil of the wing. The flap segments can form a part of the wing when in the stowed position. When the actuating flap is moved to the deployed position, the flap segments are moved by the one or more flap drive mechanisms aft and generally downward, e.g., so that the flap segments deflect a slipstream (e.g., air accelerated by one or more thrustors) from a generally horizontal orientation to a generally vertical direction downward toward the ground. The downward deflection of the slipstream can provide lift for the aircraft, which can enable or enhance vertical flight and hover capabilities of the aircraft.

Each flap drive mechanism can include a base mount coupled with the main airfoil and a plurality of tracks, including a first track, a second track, and a third track. The first track can include a first rail that is translatable relative to the base mount. The second track can be pivotably coupled with the first track and can include a second rail. The second track can provide a mount for a first flap segment of the actuating flap. The third track can be pivotably coupled with the second track and can include a third rail. The third track can provide a mount for a second flap segment of the actuating flap. The flap drive mechanism can also include a linkage system having a plurality of links, including a mounting link that provides a mount for a third flap segment of the actuating flap. In addition, the flap drive mechanism can include an actuator pivotably coupled with the base mount. The actuator is arranged to drive the plurality of links so that first rail translates relative to the base mount, the second track pivots relative to the first track while a bearing coupled with the third track slides relative to the second rail, and the third track pivots relative to the second track while a bearing coupled with the mounting link slides relative to the third rail. The translational movement of the first track can effectively guide the first flap segment forward or aft, while the pivot movement of the second track relative to the first track pivots the first flap segment into position. The translation and pivot motion of the second track causes the bearing coupled with the third track to slide relative to the second rail, effectively moving the second flap segment into position. The translation and pivot motion of the third track causes the bearing coupled with the mounting link to slide relative to the third rail, effectively moving the third flap segment into position. Accordingly, the flap drive mechanism can drive the actuating flap to the stowed position, the deployed position, or some position therebetween.

The flap drive mechanism disclosed herein can provide one or more advantages, benefits, and/or technical effects. For instance, the disclosed flap drive mechanisms can move the actuating flap in a controlled and repeatable manner while minimizing the force needed to actuate the flaps. This can help to stabilize a fixed-wing, vertical takeoff and landing (VTOL) aircraft while transitioning between vertical and horizontal flight modes as well as stabilizing the aircraft generally in hover or vertical flight. The disclosed flap drive mechanisms can include an advantageously positioned "drive point", or rather, a point where the actuator drives the linkage system to move the tracks. In one or more examples, the "drive point" is advantageously positioned so as to achieve an optimized load distribution on the flap drive mechanism, which can minimize the loads transferred to the first forward bearing and the first aft bearing that receive the first rail of the first track, among other structures. This can enable the use of smaller bearings and lighter structures. Particularly, in at least one example, the position of the "drive point" when the actuating flap is in the stowed position is advantageously positioned at or very close to the center of pressure of the wing (the wing being collectively formed by the main airfoil and the first, second, and third flap segments). In this regard, the forces transmitted to the flap drive mechanism can be reacted at or very close to the center of pressure of the wing, which helps to minimize the bending moment transmitted to the flap drive mechanism from the wing. Further, the links of the linkage system are arranged and pivotably coupled to each other and to the tracks to facilitate controlled and constrained pivot movement of the second and third tracks, and to drive translation of the first track, the second track, and the third track, even when subjected to the conditions and forces during flight. The disclosed flap drive mechanisms can provide other advantages, benefits, and/or technical effects as well.

Turning now to the drawings, FIG. 1 is a perspective view of an aircraft 100 according to one or more aspects of the present disclosure. As will be explained further below, the aircraft 100 includes features that allow for vertical and hover flight, forward cruise flight, and transition flight in which the aircraft 100 transitions from vertical to horizontal flight, or vice versa. In this regard, the aircraft 100 of FIG. 1 can be deemed a vertical takeoff and landing (VTOL) aircraft. For reference, the aircraft 100 defines a longitudinal direction L1, a lateral direction L2, and a vertical direction V, which are mutually perpendicular to one another.

As shown in FIG. 1, the aircraft 100 includes a fuselage 110. The fuselage 110 has a forward end and an aft end, and can include a flight deck/cockpit, a cabin, an avionics bay, a battery bay, etc. The aircraft 100 can be operated autonomously or can be piloted, such as by a pilot in the cockpit or remotely. The aircraft 100 also includes a tail empennage 112 arranged at the aft end of the fuselage 110. The tail empennage 112 includes stabilizers and control surfaces (e.g., ruddervators) that are controllable to maneuver the aircraft 100, such as for pitch and/or yaw control. While tail empennage 112 of the aircraft 100 of FIG. 1 has a Y-tail configuration, other configurations are contemplated. For instance, in other examples, the tail empennage 112 can have a V-tail configuration or another known tail configuration.

The aircraft 100 also includes forward wings 114 and aft wings 116. The forward wings 114 include a forward port wing 114P and a forward starboard wing 114S that each extend laterally outward from the fuselage 110, e.g., generally along the lateral direction L2. In the example of FIG. 1, the forward wings 114 are arranged in a swept configuration, and more particularly, in a backward-swept configuration. The forward port wing 114P and the forward starboard wing 114S are both swept forward-to-back from root to tip. The aft wings 116, which are arranged aft of the forward wings 114 along the longitudinal direction L1, include an aft port wing 116P and an aft starboard wing 116S that each extend laterally outward from the fuselage 110, e.g., generally along the lateral direction L2. In the example of FIG. 1, the aft wings 116 are arranged in a swept configuration, and more particularly, in a forward-swept configuration. The aft port wing 116P and the aft starboard wing 116S are both swept back-to-forward from root to tip. Moreover, in the illustrated example of FIG. 1, the forward port wing 114P and the aft port wing 116P are connected at their respective tips by a port winglet 118. Similarly, the forward starboard wing 114S and the aft starboard wing 116S are connected at their respective tips by a starboard winglet 120. The forward wings 114 are coupled with the fuselage 110 at a lower mount position than are the aft wings 116. In this regard, the port winglet 118 and the starboard winglet 120 extend vertically to connect their respective relatively low-mounted forward wings 114 with their respective relatively high-mounted aft wings 116. In other examples, the aircraft 100 can have other wing configurations.

Forward thrustors 122 are arranged along the forward wings 114. For the aircraft 100 of FIG. 1, the forward thrustors 122 are configured as electrically-powered propellers each with a substantially horizontal rotation axis (i.e., an axis substantially perpendicular to the vertical direction V). However, in other examples, the forward thrustors 122 can have other suitable configurations, such as ducted fans. In the example of FIG. 1, six (6) forward thrustors 122 are arranged along the forward port wing 114P and six (6) forward thrustors 122 are arranged along the forward starboard wing 114S. However, other suitable numbers of forward thrustors 122 are contemplated. In one or more examples, the forward thrustors 122 can be statically fixed relative to their respective wings, or rather, non-tiltable.

Further, in one or more examples, the forward thrustors 122 can be arranged along the forward port wing 114P and/or along the forward starboard wing 114S so that their propeller blades rotate in different planes. For instance, for the forward port wing 114P, the forward thrustors 122 can include a first set and a second set. The forward thrustors 122 of the first set can be arranged forward of the forward thrustors 122 of the second set, e.g., along the longitudinal direction L1. The forward thrustors 122 of the first set can alternate with the forward thrustors 122 of the second set, e.g., along the span of the wing. The forward thrustors 122 of the forward starboard wing 114S can be arranged similarly to the forward thrustors 122 of the forward port wing 114P. In other examples, the forward thrustors 122 can have other arrangements. For instance, in at least one example, the forward thrustors 122 can be arranged along the forward port wing 114P and/or the forward starboard wing 114S so that their propeller blades rotate in substantially coplanar planes and/or overlapping planes, e.g., along the longitudinal direction L1.

Aft thrustors 124 are arranged along the aft wings 116. For the aircraft 100 of FIG. 1, the aft thrustors 124 are configured as electrically-powered propellers each with a substantially vertical rotation axis. In this regard, the propeller blades of each of the aft thrustors 124 rotate in a substantially horizontal plane (i.e., a plane perpendicular to the Z-direction). Accordingly, the aft thrustors 124 are arranged to produce substantially vertical thrust, e.g., to provide upward lift during vertical flight or hover. In at least one example, when the aircraft 100 transitions to horizontal flight, the aft thrustors 124 can be controlled to an off state, or rather, so that the aft thrustors 124 are not actively rotatably driven. In one or more other examples, the aft thrustors 124 can have other suitable configurations. In the example of FIG. 1, two (2) aft thrustors 124 are arranged along the aft port wing 116P and two (2) aft thrustors 124 are arranged along the aft starboard wing 116S. However, other suitable numbers of aft thrustors 124 are contemplated. In one or more examples, the aft thrustors 124 can be statically fixed relative to their respective wings, or rather, non-tiltable.

As further shown in FIG. 1, the aircraft 100 includes actuating flaps 126. one of the actuating flaps 126 is arranged generally at an aft side of the forward port wing 114P. The actuating flap 126 can extend along an entirety of the span of the forward port wing 114P or along some portion of the span, such as at least eighty percent (80%) of the span, such as at least ninety percent (90%) of the span, etc. One of the actuating flaps 126 is arranged generally at an aft side of the forward starboard wing 114S. The actuating flap 126 can extend along an entirety of the span of the forward starboard wing 114S or along some portion of the span, such as at least eighty percent (80%) of the span, such as at least ninety percent (90%) of the span, etc.

Figure 2:
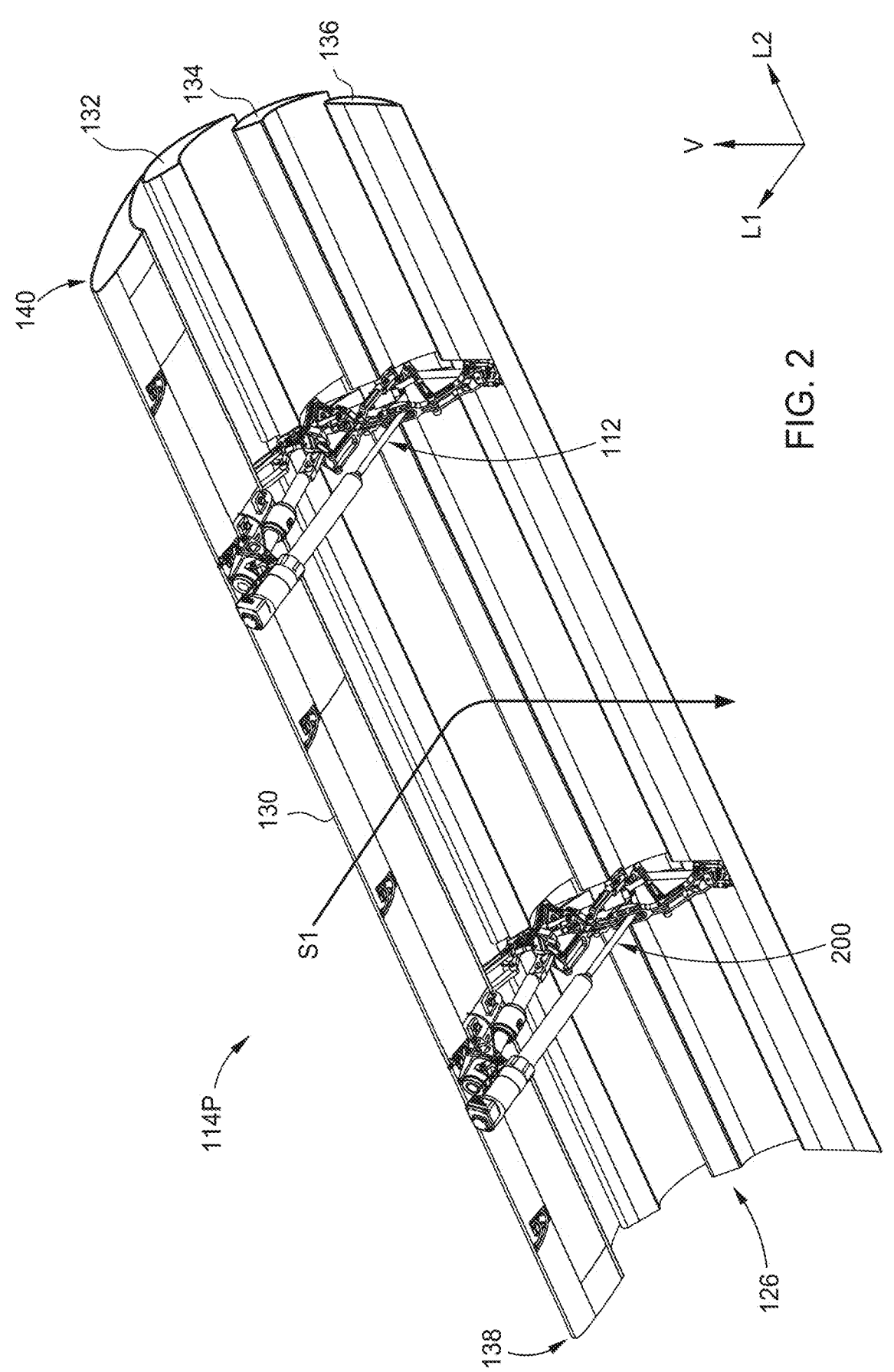
FIG. 2 is a perspective view of an underside of one of the forward wings of the aircraft of FIG. 1.

The actuating flaps 126 can each be moved between a stowed position and a deployed position, as well as positions therebetween. During vertical flight or hover, such as during vertical takeoffs and landings, the actuating flaps 126 can be deployed to enhance the lift of the aircraft 100. During horizontal flight, the actuating flaps 126 can be retracted to the stowed position to enhance the aerodynamics of the aircraft 100. Further, during a transition from vertical flight to horizontal flight, the actuating flaps 126 can be moved from a deployed position to the stowed position as the aircraft gains speed, and this movement can allow the aircraft 100 to generate the required lift at different speeds. Accordingly, the actuating flaps 126 can enable vertical takeoff and can retract during transition to maintain a stable lift coefficient until the aircraft 100 is in cruise mode. In FIG. 1, both of the actuating flaps 126 are depicted in the stowed position. In FIG. 2, which is a perspective view of an underside of the forward port wing 114P of the aircraft 100, the actuating flap 126 of the forward port wing 114P is illustrated in the deployed position. The actuating flap 126 of the forward starboard wing 114S can be similarly deployed, e.g., in synchronization with the actuating flap 126 of the forward port wing 114P. As will be explained in greater detail herein, the actuating flaps 126 can be moved between their respective stowed and deployed positions by flap drive mechanisms.

The aircraft 100 of FIG. 1 is provided by way of example. The inventive aspects disclosed herein are applicable to aircraft having other configurations as well. Moreover, the inventive aspects can be implemented in other vehicle types, such as spacecraft.

FIG. 2 is a perspective view of an underside of the forward port wing 114P of the aircraft 100 of FIG. 1, and depicts a pair of flap drive mechanisms 200 arranged to move flap segments of the actuating flap 126. The forward starboard wing 114S of the aircraft 100 of FIG. 1 can be configured in a similar manner as the forward port wing 114P.

As shown in FIG. 2, the forward port wing 114P includes a main airfoil 130 and the actuating flap 126 generally arranged at an aft side of the main airfoil 130. The actuating flap 126 includes a first flap segment 132, a second flap segment 134, and a third flap segment 136. In the example of FIG. 2, the first flap segment 132 is the leading flap segment, the second flap segment 134 is an intermediate flap segment, and the third flap segment 136 is the trailing flap segment. In other examples, the actuating flap 126 can more or less than three (3) flap segments.

When the actuating flap 126 is arranged in the deployed position as shown in FIG. 2, a slipstream S1 (i.e., a stream of fluid driven aft by the forward thrustors 122, which have been removed for illustrative purposes in FIG. 2; see FIG. 1) can be deflected by about ninety degrees) (90°) downward toward the ground, e.g., along the vertical direction V. That is, the slipstream S1 flowing under the forward port wing 114P can be guided from a generally horizontal orientation to a generally vertically downward orientation, providing lift or upward force for the aircraft 100. Accordingly, for vertical and hover mode flight and with brief reference to FIG. 1, lift can be generated at the forward wings 114 by the forward thrustors 122 in combination with the deployed actuating flaps 126, as well as at the aft wings 116 by the aft thrustors 124 with their substantially vertical rotation axes.

In one or more examples, at least one flap drive mechanism 200 can be arranged along the span of each of the forward wings 114. For instance, in the example of FIG. 2, two (2) flap drive mechanisms 200 are arranged along the span of the forward port wing 114P. The span of the forward port wing 114P can extend between a root 138 and a tip 140 of the forward port wing 114P. In at least one example, a first one of the flap drive mechanisms 200 can be arranged a distance from the root 138 that is about 30% of the span (i.e., within 5% of 30%) and a second one of the flap drive mechanisms 200 can be arranged a distance from the root 138 that is about 70% of the span (i.e., within 5% of 70%). Such a configuration can provide an advantageous load split between the flap drive mechanisms 200 such that most of the out of plane bending loads with respect to the flap drive mechanism plane cancel each other out in most flight conditions. The load split can also provide high out of plane stiffness, as well as lower deflection and less vibration compared to other configurations. However, other configurations are contemplated. In at least one example, a first one of the flap drive mechanisms 200 can be arranged at a first distance from the root 138 and a second one of the flap drive mechanisms 200 can be arranged a second distances from the root 138 such that the two flap drive mechanisms 200 cancel (or at least substantially cancel) out of plane bending loads, e.g., in at least on flight mode. Such an arrangement can advantageously provide a robust configuration to extend and retract the actuating flap 126 along the span with high stiffness and load bearing capacity.

Figure 3:
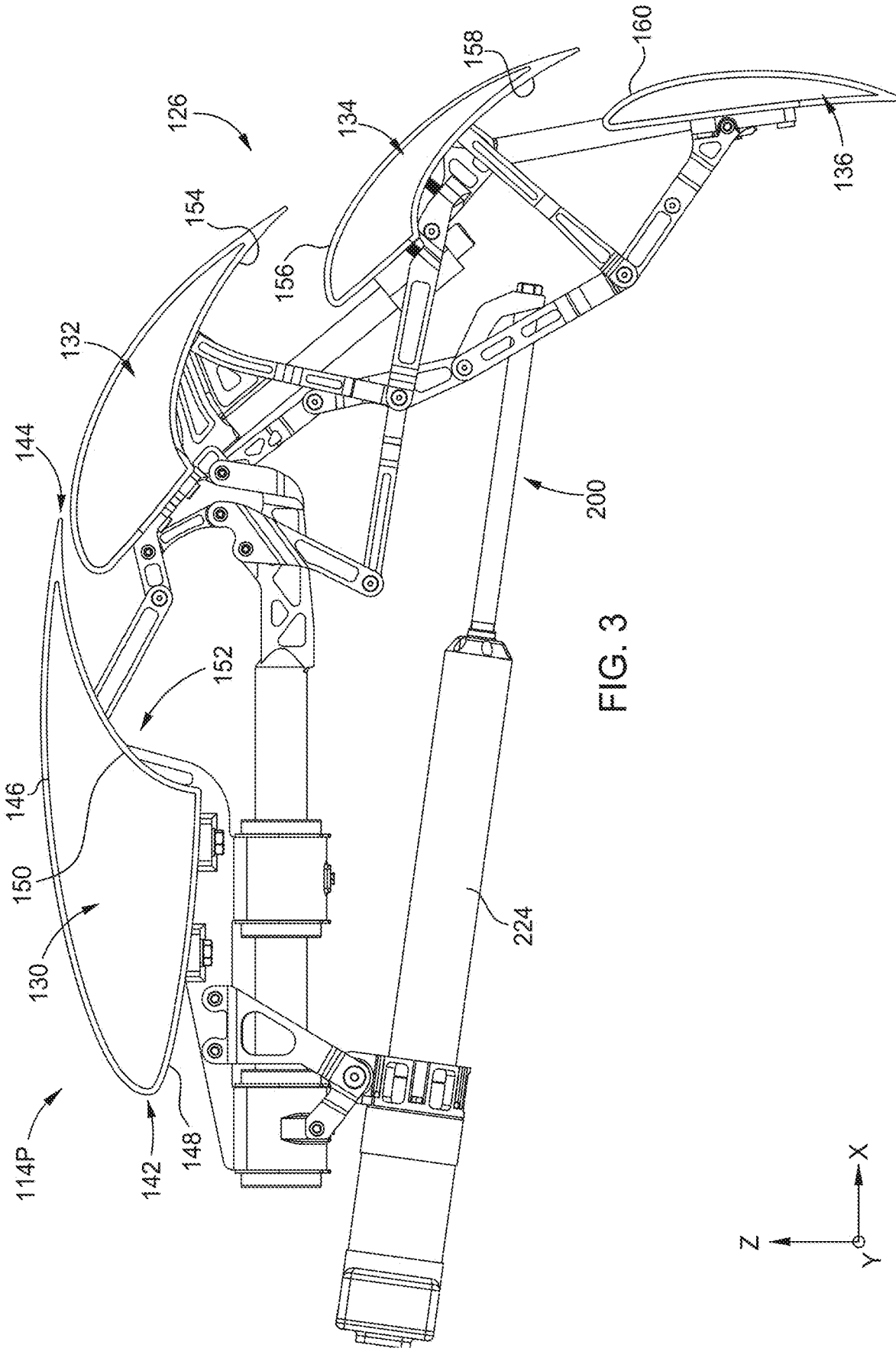
FIG. 3 is a side view of a flap drive mechanism according to one or more aspects of the present disclosure, with flap segments thereof arranged in a deployed position.
Figure 4:
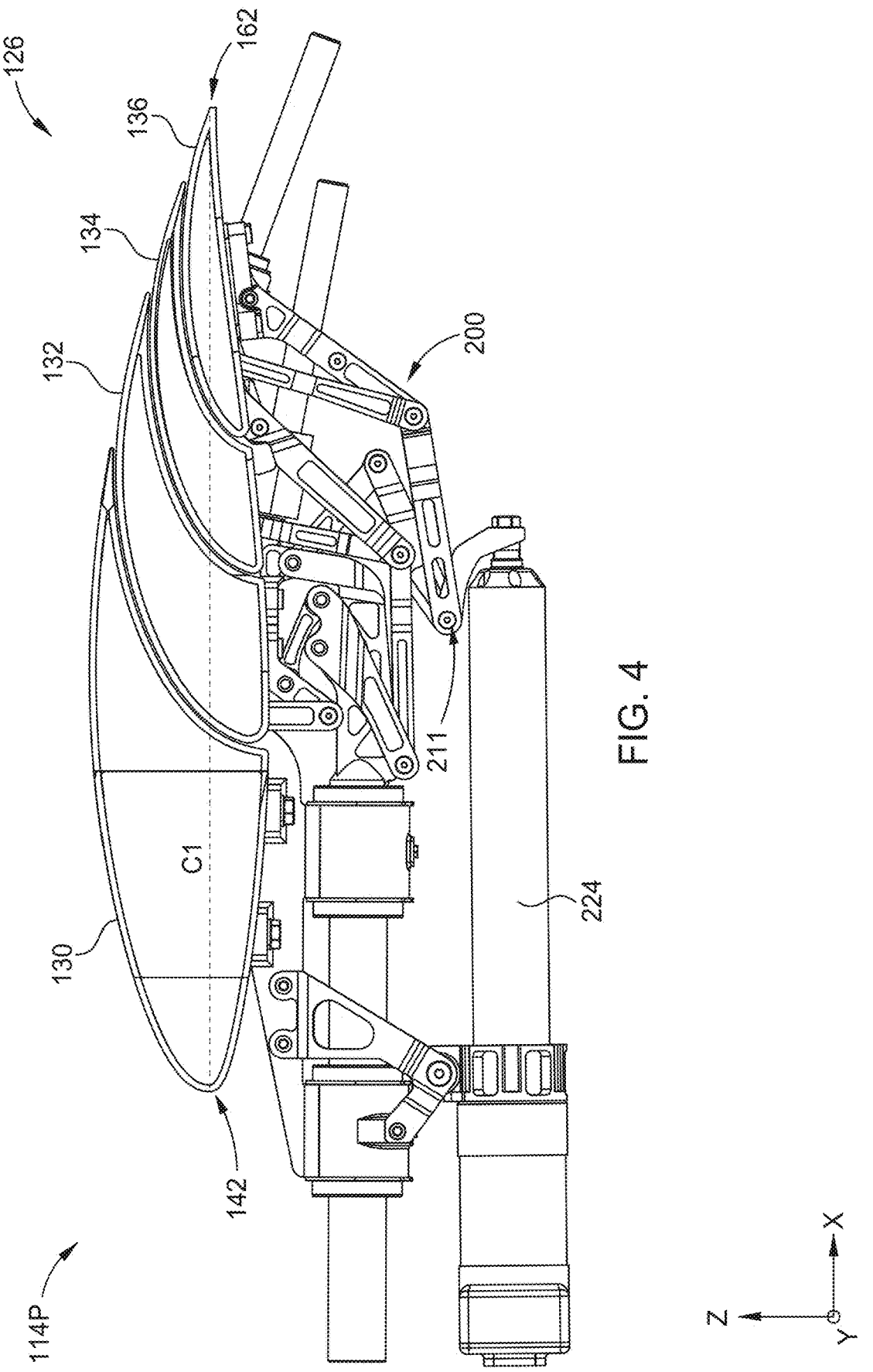
FIG. 4 is a side view of the flap drive mechanism of FIG. 3, with the flap segments arranged in a stowed position.

With reference now to FIGS. 3 and 4, side views of one of the flap drive mechanisms 200 is depicted, with the actuating flap being arranged in a deployed position in FIG. 3 and a stowed position in FIG. 4. For reference, the flap drive mechanism 200 of FIGS. 3 and 4 can define an X-direction, a Y-direction, and a Z-direction, which are mutually perpendicular to one another. In one or more examples, the Z-direction can correspond to the vertical direction V. The X-direction extends generally along the longitudinal direction L1 but is slightly offset therefrom, e.g., due to the swept configuration of the forward port wing 114P. The Y-direction extends generally along the lateral direction L2 but is slightly offset therefrom, e.g., due to the swept and dihedral configuration of the forward port wing 114P.

As shown in FIG. 3, the main airfoil 130 of the forward port wing 114P has a leading edge 142 and a trailing edge 144. The main airfoil 130 also has a top side 146 and a bottom side 148, as well as an aft side 150 that extends between the trailing edge 144 and the bottom side 148. The aft side 150 of the main airfoil 130 and the top side of the first flap segment 132 are shaped complementary to one another so that the first flap segment 132 can be fit in place next to the main airfoil 130 with a minimal gap therebetween, e.g., when the actuating flap 126 is in the stowed position as shown in FIG. 4. The main airfoil 130 can define a recess 152 in which the first flap segment 132 can be received.

Similarly, an aft side 154 of the first flap segment 132 and a top side 156 of the second flap segment 134 are shaped complementary to one another so that the second flap segment 134 can be fit in place next to the first flap segment 132 with a minimal gap therebetween, e.g., when the actuating flap 126 is in the stowed position as shown in FIG. 4. The first flap segment 132 can define a recess in which the second flap segment 134 can be received. Also, an aft side 158 of the second flap segment 134 and a top side 160 of the third flap segment 136 are shaped complementary to one another so that the third flap segment 136 can be fit in place next to the second flap segment 134 with a minimal gap therebetween, e.g., when the actuating flap 126 is in the stowed position as shown in FIG. 4. The second flap segment 134 can define a recess in which the third flap segment 136 can be received.

Accordingly, as illustrated in FIG. 4, the first flap segment 132, the second flap segment 134, and the third flap segment 136 can be retracted into the stowed position with a compact arrangement. In this regard, the first flap segment 132, the second flap segment 134, and the third flap segment 136 of the actuating flap 126 can form a part of the forward port wing 114P when the actuating flap 126 is in the stowed position. The first flap segment 132, the second flap segment 134, and the third flap segment 136 of the actuating flap 126 can form a part of a top side and the bottom side of the forward port wing 114P.

In one or more examples, the first flap segment 132, the second flap segment 134, and the third flap segment 136 of the actuating flap 126 form at least fifty percent (50%) of a bottom side of the forward port wing 114P, with the bottom side extending between the leading edge 142 of the main airfoil 130 and a trailing edge 162 of the third flap segment 136, as shown in FIG. 4. In yet other examples, the first flap segment 132, the second flap segment 134, and the third flap segment 136 of the actuating flap 126 can form at least sixty percent (60%) of the bottom side of the forward port wing 114P.

In one or more examples, the first flap segment 132, the second flap segment 134, and the third flap segment 136 of the actuating flap 126 can extend at least fifty percent (50%) of a chord length of a chord C1 of the forward port wing 114P, with the chord C1 being a straight line extending between the leading edge 142 of the main airfoil 130 and the trailing edge 162 of the third flap segment 136. In yet other examples, the first flap segment 132, the second flap segment 134, and the third flap segment 136 of the actuating flap 126 can extend at least sixty percent (60%) of the chord length of the chord C1 of the forward port wing 114P.

When the actuating flap 126 is moved from the deployed position (FIG. 3) to the stowed position (FIG. 4), the first flap segment 132, the second flap segment 134, and the third flap segment 136 can be moved forward and generally upward by the flap drive mechanism 200. When the actuating flap 126 is moved from the stowed position (FIG. 4) to the deployed position (FIG. 3), the first flap segment 132, the second flap segment 134, and the third flap segment 136 can be moved aft and generally downward by the flap drive mechanism 200. When in the deployed position, the chord of the third flap segment 136 is arranged substantially vertically (whereas the chord of the third flap segment 136 is arranged substantially horizontally in the stowed position). In this regard, the orientation of the third flap segment 136 can be changed by ninety degrees) (90°) or more between the two positions. Moreover, in the deployed position, the chords of the first flap segment 132, the second flap segment 134, and the third flap segment 136 of the actuating flap 126 can be oriented at successively greater angles with respect to a horizontal reference axis (i.e., a direction perpendicular to the vertical direction), with the chord of the third flap segment 136 having a greatest angle with respect to the horizontal reference axis, the chord of the first flap segment 132 having a smallest angle with respect to the horizontal reference axis, and the chord of the second flap segment 134 having an angle between the greatest and smallest angle with respect to the horizontal reference axis. The first flap segment 132, the second flap segment 134, and the third flap segment 136 are thus oriented so that their respective bottom and aft sides deflect the slipstream S1 downward toward the ground to generate upward lift. In addition, in the deployed position, the first flap segment 132, the second flap segment 134, and the third flap segment 136 of the actuating flap 126 do not overlap one another along the Z-direction, and in one or more examples, the first flap segment 132 overlaps the main airfoil 130 along the Z-direction and the X-direction.

Figure 5:
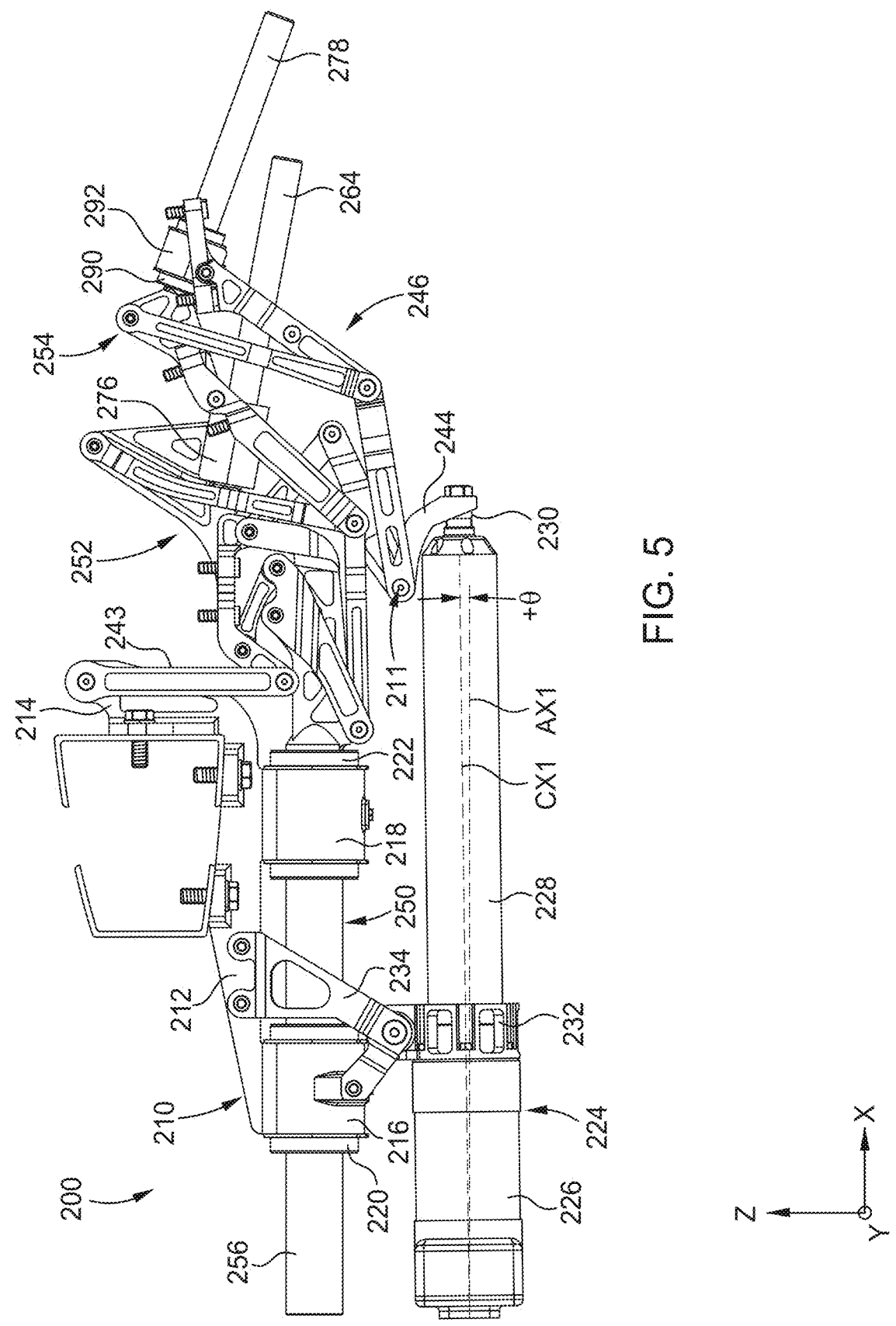
FIG. 5 is a side view of the flap drive mechanism of FIG. 3 arranged in the stowed position, with the flap segments removed for illustrative purposes.
Figure 6:
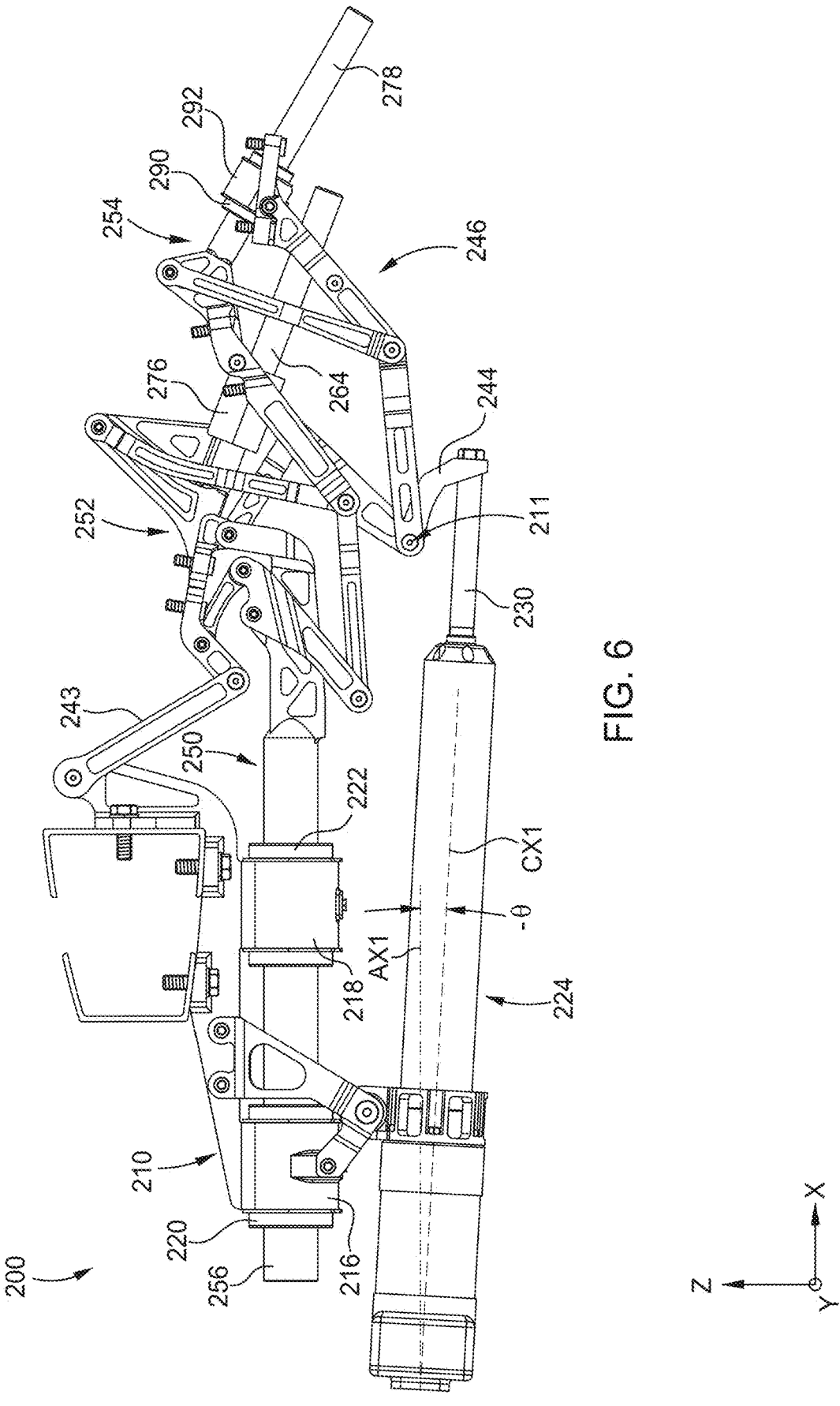
FIG. 6 is a side view of the flap drive mechanism of FIG. 3 arranged in a midway position, with the flap segments removed for illustrative purposes.
Figure 7:
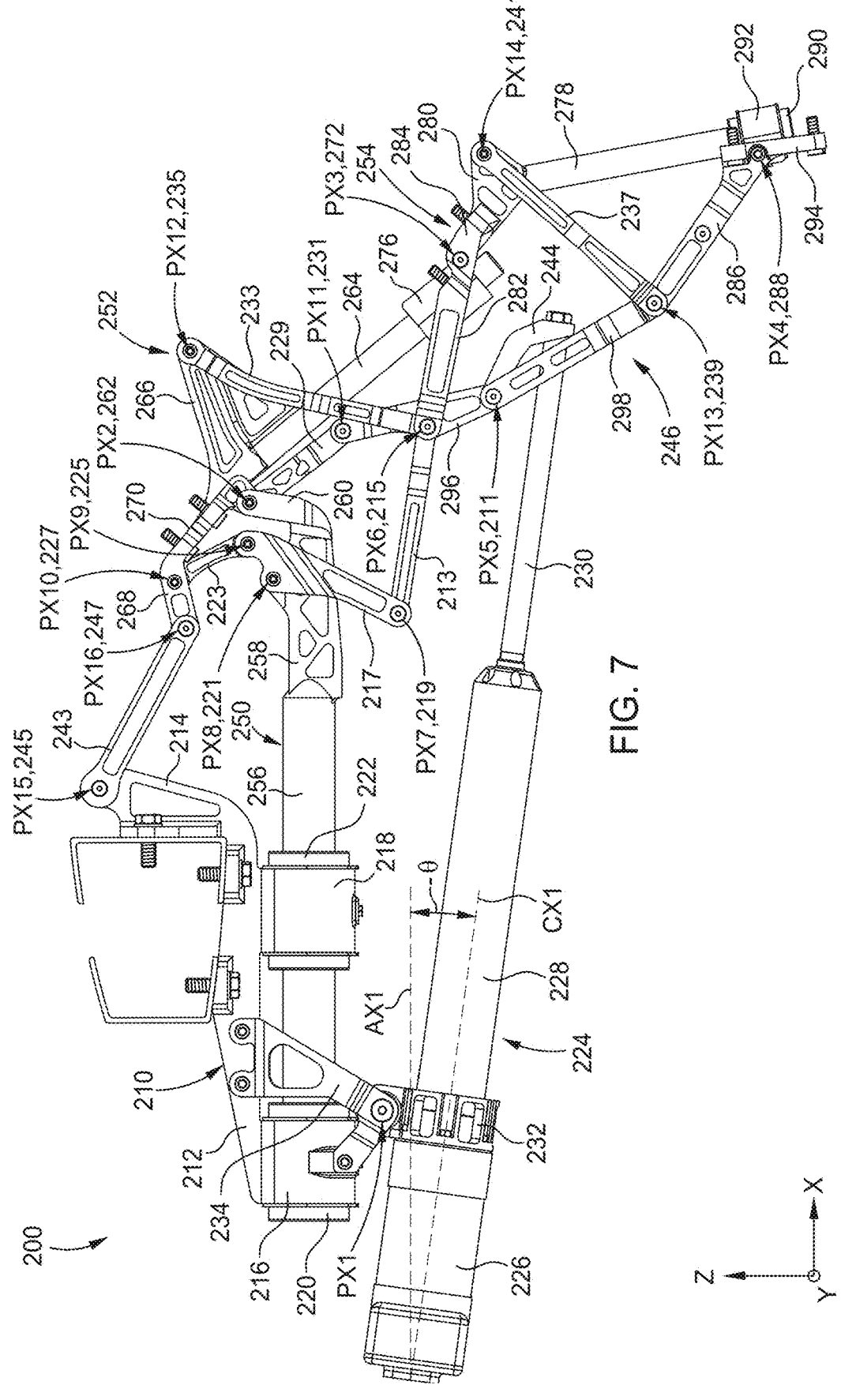
FIG. 7 is a side view of the flap drive mechanism of FIG. 3 arranged in the deployed position, with the flap segments removed for illustrative purposes.
Figure 8:
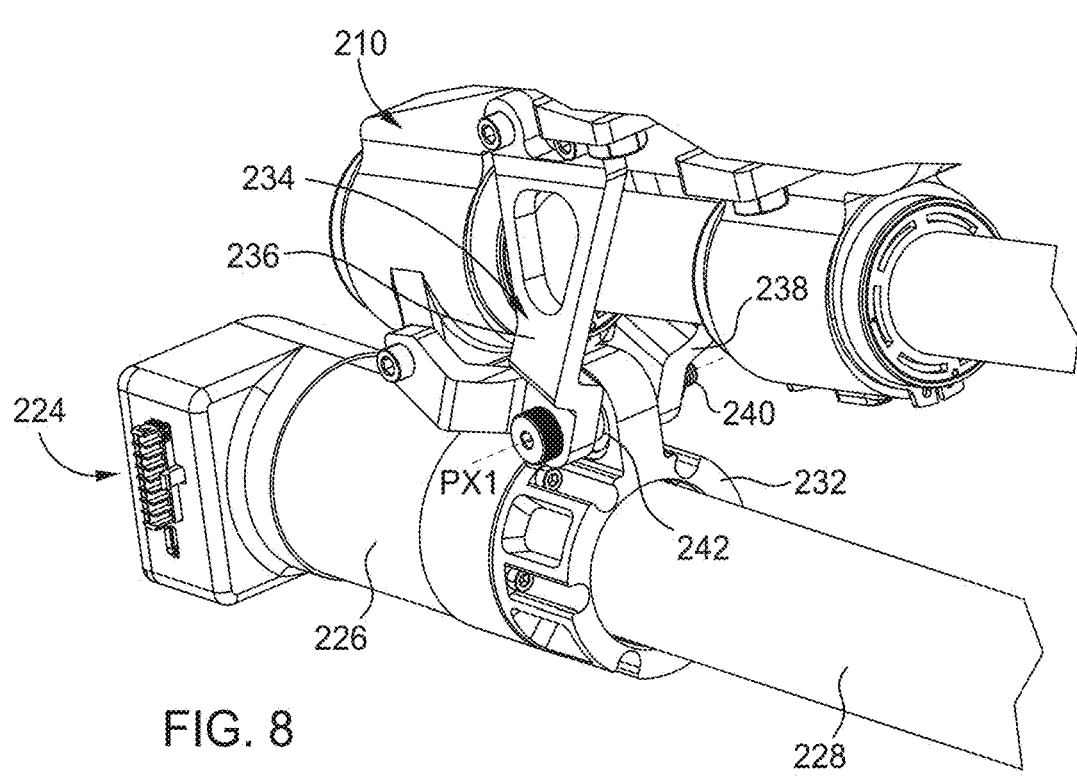
FIG. 8 is a close-up perspective view of the flap drive mechanism of FIG. 3 depicting an actuator pivotably coupled with a base mount.

With reference now generally to FIGS. 5, 6, and 7, the architecture of one of the flap drive mechanisms 200 will now be described in detail. In FIGS. 5, 6, and 7, the main airfoil 130 and the first, second, and third flap segments 132, 134, 136 have been removed for illustrative purposes. FIGS. 8, 9, 10, 11, and 12 are also referenced below.

As illustrated, the flap drive mechanism 200 has a base mount 210 that can be coupled with the main airfoil 130 (FIGS. 3 and 4). The base mount 210 has a main body 212, a vertically-oriented mounting flange 214 that extends upward from the main body 212, and bearing housings extending downward from the main body 212 along the Z-direction. A plurality of fasteners can be used to couple the base mount 210 to the main airfoil 130 (FIGS. 3 and 4) of the wing.

The bearing housings include a first forward bearing housing 216 and a first aft bearing housing 218. The first aft bearing housing 218 is spaced from, and positioned aft of, the first forward bearing housing 216, e.g., along the X-direction. The first forward bearing housing 216 supports a first forward bearing 220 and the first aft bearing housing 218 supports a first aft bearing 222. The first forward bearing 220 and the first aft bearing 222 can be advantageously spaced and positioned to react the bending moment from the wing. The first forward bearing housing 216 and the first aft bearing housing 218 are each tubular, or rather, each have a hollow, cylindrical shape. In this way, the first forward bearing 220 and the first aft bearing 222 can be received within the first forward bearing housing 216 and the first aft bearing housing 218, respectively. As will be explained further below, a first rail of a first track is received and supported by the first forward bearing 220 and the first aft bearing 222. The first rail of the first track can be slidable or translatable relative to the base mount 210, e.g., along the X-direction.

The flap drive mechanism 200 also includes an actuator 224. In this example, the actuator 224 is a linear actuator. However, in other examples, the actuator 224 can be another suitable type of actuator. The actuator 224 includes a motor 226, an actuator housing 228, a rod 230, and an actuator mount 232. The rod 230 is receivable within the actuator housing 228 and can be controlled to translate relative to the actuator housing 228. For instance, the motor 226 can be controlled to extend a distal end of the rod 230 away from the actuator housing 228, e.g., to deploy the actuating flap 126 as shown in FIG. 7, or to move the distal end of the rod 230 toward the actuator housing 228, e.g., to retract or stow the actuating flap 126 as shown in FIG. 5. Accordingly, the actuator 224 acts as the drive mechanism for deploying and retracting the actuating flap 126.

In one or more examples, the actuator 224 is pivotably coupled with the base mount 210. For instance, the actuator 224 can be arranged to pivot relative to the base mount 210, e.g., about a non-movable pivot axis PX1 extending parallel to the Y-direction. The pivot axis is "non-movable" in the sense that the pivot axis is fixed relative to the base mount 210. An actuator mounting bracket 234 is fixedly coupled with the main body 212 and the first forward bearing housing 216 of the base mount 210. As shown in a close-up view in FIG. 8, the actuator mounting bracket 234 has a first arm 236 and a second arm 238 that receive a pin 240. The pin 240 also extends through the actuator mount 232 that is secured to the actuator housing 228. In one or more examples, the actuator mount 232 includes a spherical joint 242, also referred to as a ball joint. The pin 240 can extend through the first arm 236, through the spherical joint 242, and through the second arm 238. The pin 240 can be secured at its ends by one or more fasteners, such as nuts, caps, etc. The spherical joint 242 can facilitate smooth and flexible pivot motion of the pivot motion of the actuator 224 relative to the base mount 210.

In one or more examples, when the actuating flap 126 is in the stowed position, e.g., as shown in FIG. 5, the actuator 224 can be oriented so that a central axis CX1 of the actuator 224 has a positive pitch angle +θ relative to a reference axis AX1. The reference axis AX1 can extend in a horizontal plane (i.e., a plane perpendicular to the Z-direction). As the actuating flap 126 is moved toward the deployed position, the aft end of the actuator 224, or rather the distal end of the rod 230, can pitch downward so that the central axis CX1 of the actuator 224 has a negative pitch angle −θ relative to the reference axis AX1. For instance, in FIG. 6, which is the midway point of travel between the stowed position (FIG. 5) and the deployed position (FIG. 7) of the actuating flap 126, the central axis CX1 of the actuator 224 has a negative pitch angle −θ relative to the reference axis AX1. Further, when the actuating flap 126 is in the deployed position as shown in FIG. 7, the negative pitch angle −θ can be at its maximum absolute value with respect to the reference axis AX1. The pitching of the distal end of the actuator 224 can facilitate the deployment of the actuating flap 126 aft and downward during deployment and forward and upward during retraction.

Figure 9:
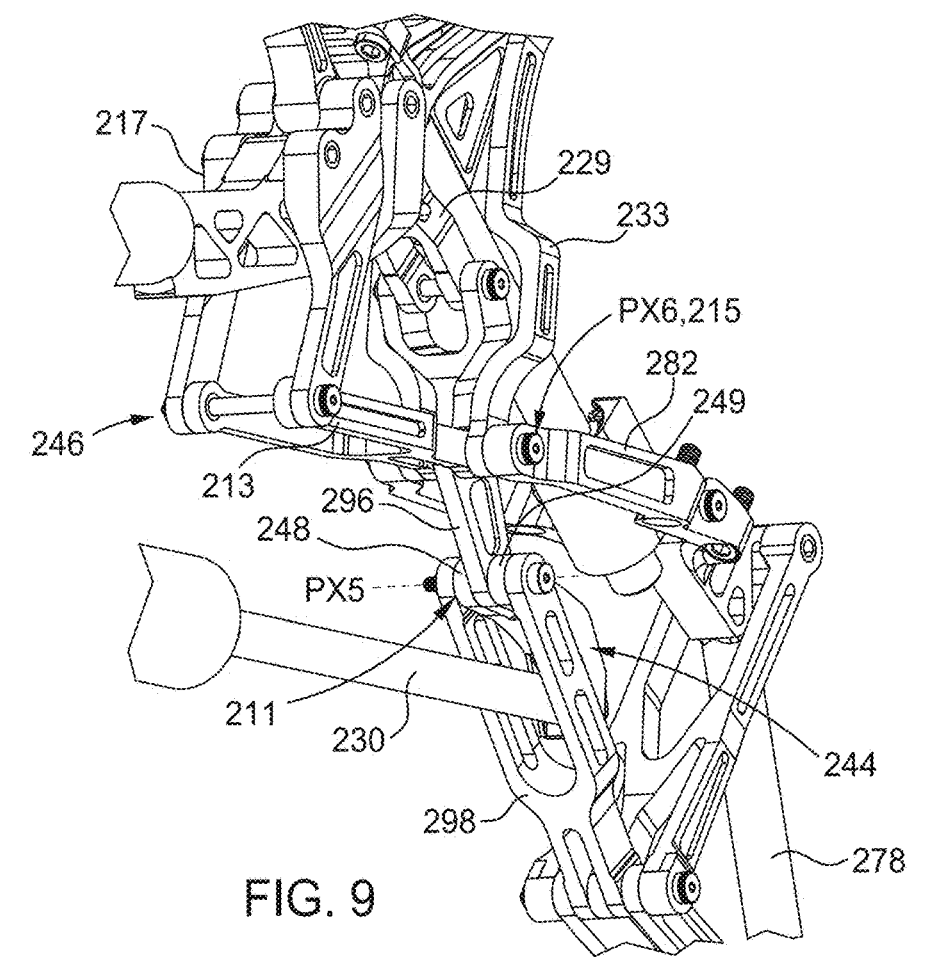
FIG. 9 is a close-up perspective view of the flap drive mechanism of FIG. 3 depicting a drive clevis coupled with a linkage system.

In one or more examples, the distal end of the rod 230 can be coupled with a drive clevis 244. In at least one example, the drive clevis 244 can be coupled with the rod 230 by a fastener that extends through the drive clevis 244 and threadingly engages the rod 230. The drive clevis 244 can act as the "drive point" for driving a linkage system 246 of the flap drive mechanism 200. Depending on whether the rod 230 is controlled to extend or retract relative to the actuator housing 228, the drive clevis 244 can drive the linkage system 246 to deploy the actuating flap 126 to the deployed position or to retract the actuating flap 126 to the stowed position, or in some instances, to some position therebetween. As shown in FIG. 9, the drive clevis 244 can include a first prong 249 and a second prong 248 that are pivotably coupled with one or more links of the linkage system 246. In one or more other examples, the distal end of the rod 230 can be coupled directly with one or more drive links of the linkage system 246, rather than having the drive clevis 244.

In one or more examples, the "drive point" is advantageously positioned so as to achieve an optimized load distribution on the flap drive mechanism 200, which can minimize the loads transferred to the first forward bearing 220 and the first aft bearing 222, among other structures. This can enable the use of smaller bearings and lighter structures. Particularly, in this example, the position of the "drive point" when the actuating flap 126 is in the stowed position is advantageously positioned at or very close to the center of pressure of the wing, which is collectively formed by the main airfoil 130 and the first, second, and third flap segments 132, 134, 136. In this regard, the forces transmitted to the flap drive mechanism 200 are reacted at or very close to the center of pressure of the wing, which helps to minimize the bending moment transmitted to the flap drive mechanism 200. The center of pressure on a wing can be defined as the focal point of the lift force on the wing, which can change as the angle of attack of the wing changes. As shown in FIGS. 4 and 5, the drive point (where a drive link pivot joint 211 is located in this example), is positioned forward of the distal end of the rod 230 along the X-direction, above the actuator housing 228 along the Z-direction, and aligned with the bottom side of the first flap segment and a top side of the main airfoil 130 along the X-direction. In at least one example, e.g., as shown in FIGS. 4 and 5, the drive point (where the drive link pivot joint 211 is located) is substantially aligned with a midpoint of a chord C1 of the wing along the X-direction (e.g., within at least ten percent (10%) of the midpoint of the chord C1), with the chord C1 being a straight line extending from the leading edge 142 of the main airfoil 130 to a trailing edge of the third flap segment 136 (or trailing flap segment, in examples in which more or less than three flap segments are present). In at least one example, the drive point (where the drive link pivot joint 211 is located) is substantially aligned (e.g., within at least ten percent (10%)) with a center of pressure of the wing along a forward-to-aft direction of the wing (e.g., the X-direction in this example).

The linkage system 246 includes a plurality of links that, when driven by the actuator 224, transmit power to, and cause motion of, a plurality tracks. The plurality of tracks includes a first track 250, a second track 252, and a third track 254. In at least one example, the first track 250 has a first rail 256, which is received by the first forward bearing 220 and the first aft bearing 222, a first track arm 258 that extends aft from the first rail 256, and a first pivot post 260 that extends upward and aft from the first track arm 258. The first rail 256 is supported by, and translatable relative to, the first forward bearing 220 and the first aft bearing 222. Accordingly, the first track 250 is slidable or translatable relative to the base mount 210, e.g., along the X-direction.

Figure 10:
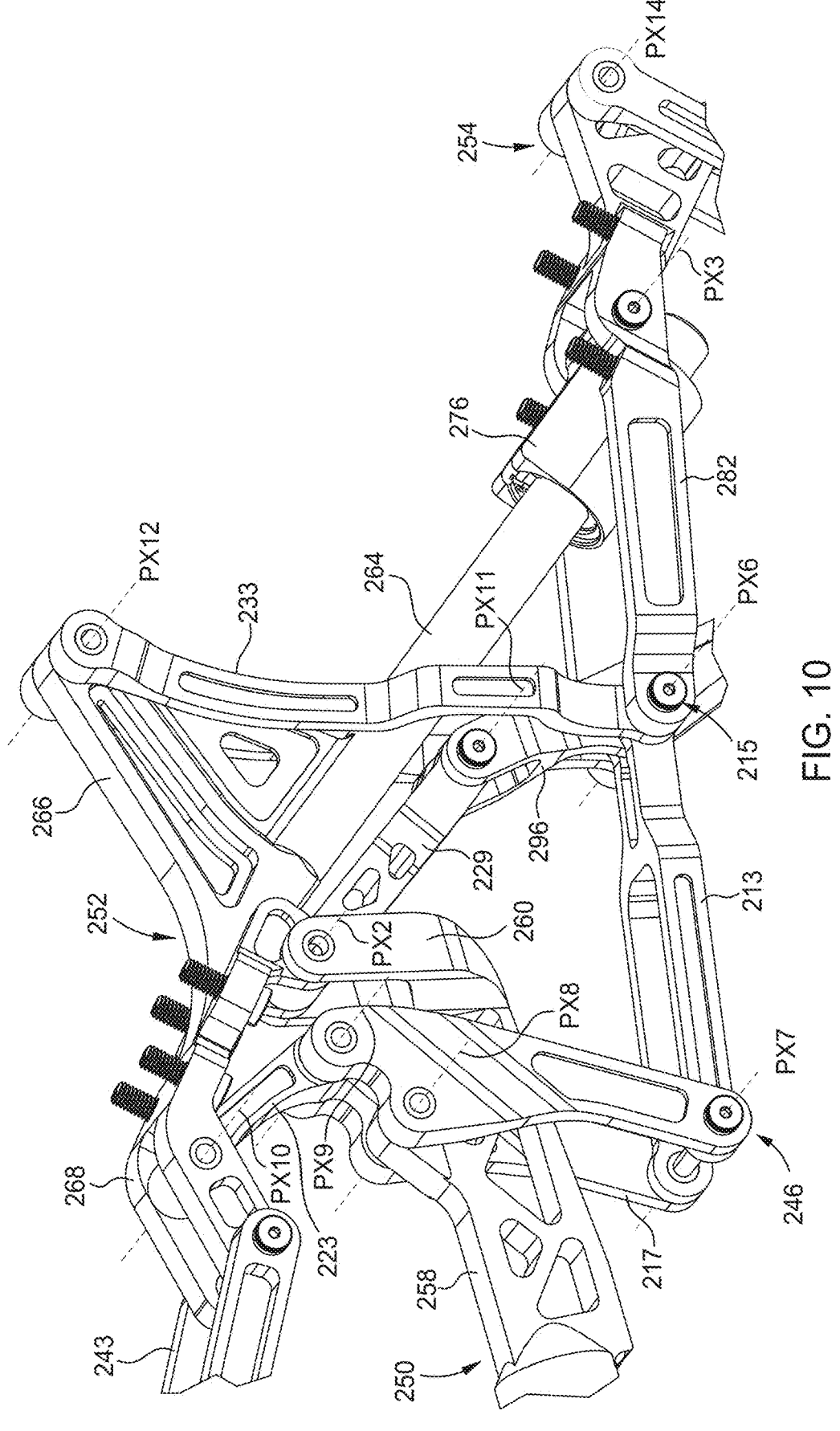
FIG. 10 is a close-up side perspective view of the flap drive mechanism of FIG. 3 depicting a portion of a first track, a second track pivotably coupled with the first track and a portion of a third track, which is pivotably coupled with the second track.

The second track 252 is pivotably coupled with the first track 250 at a link-to-double track pivot joint 262. Accordingly, the second track 252 can be arranged to pitch or pivot relative to the first track 250, e.g., about a movable pivot axis PX2 extending parallel to the Y-direction. The pivot axis PX2 is "movable" in the sense that the pivot axis PX2 is movable relative to the base mount 210. As shown in FIG. 10, in at least one example, the first pivot post 260 of the first track 250 can be arranged as a clevis having a first prong and a second prong. A pin can be received by the second track 252 as well as by the first prong and the second prong of the first pivot post 260. In this regard, the link-to-double track pivot joint 262 can be a revolute or hinge joint.

Further, the second track 252 includes a second rail 264, a second pivot post 266, and a second track arm 268 extending forward of the second track 252. The second pivot post 266 extends upward from the second track arm 268 and the second rail 264. The second pivot post 266 has a triangular shape, which can provide stability to the second track 252 and the linkage system 246 overall. The second track arm 268 provides a first flap segment mount 270 to which the first flap segment 132 can be mounted (see FIGS. 3 and 4).

Figure 11:
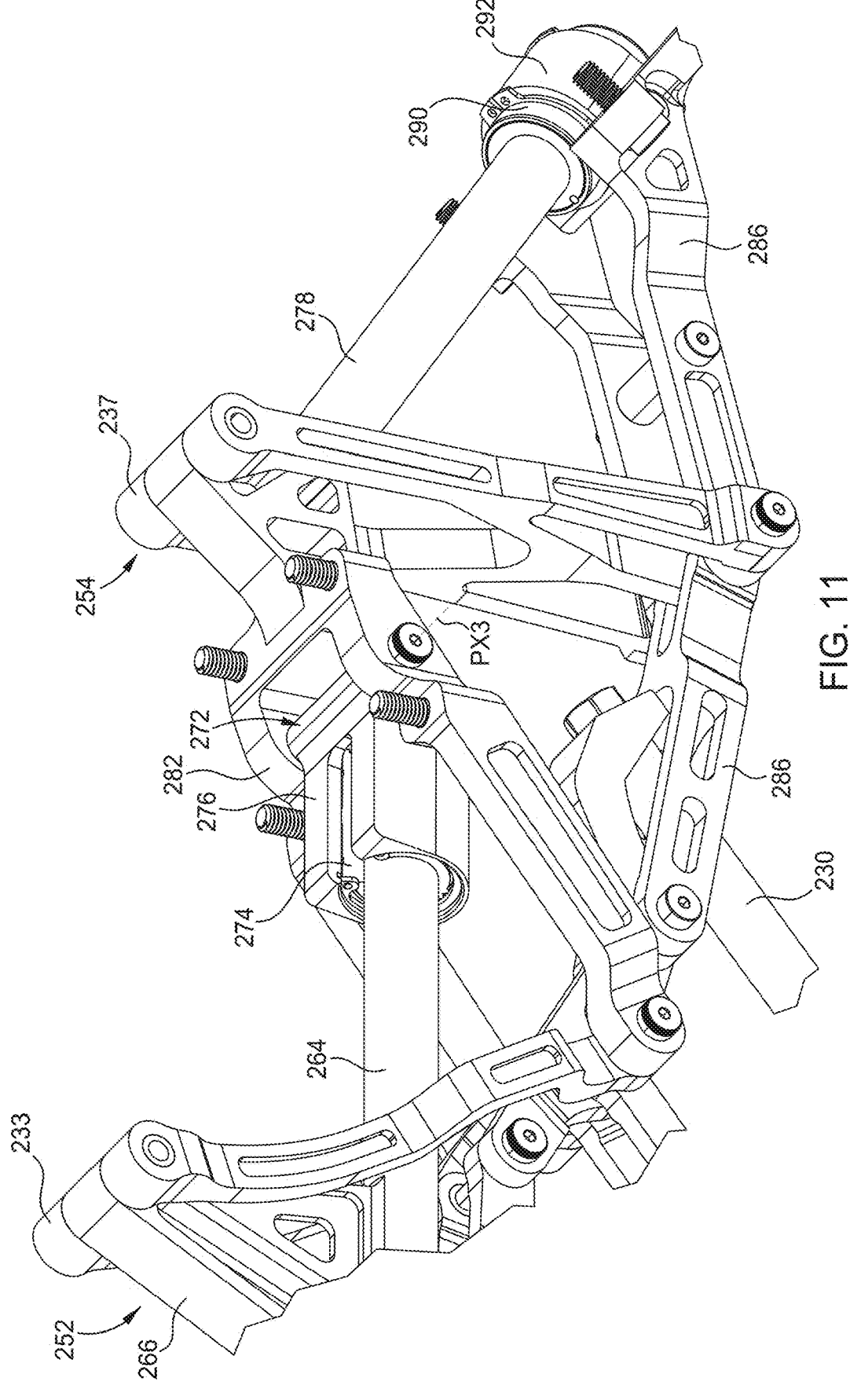
FIG. 11 is a close-up perspective view of the flap drive mechanism of FIG. 3 detailing features of the second track and the third track.

The third track 254 is pivotably coupled with the second track 252 at a track-to-track pivot joint 272. Accordingly, the third track 254 can be arranged to pitch relative to the second track 252, e.g., about a movable pivot axis PX3 extending parallel to the Y-direction. The pivot axis PX3 is "movable" in the sense that the pivot axis PX3 is movable relative to the base mount 210. In at least one example, a second bearing 274, which is received by a second bearing housing 276, is slidable relative to the second rail 264. As shown in FIG. 11, the second bearing housing 276 is pivotably coupled with the third track 254 at the track-to-track pivot joint 272, e.g., by way of a pin. Further, in at least one example, the second bearing 274 can be a two hundred seventy degree) (270°) bearing that wraps three-quarters around the second rail 264 of the second track 252. The un-wrapped portion of the second rail 264 can be its top side, e.g., as shown in FIG. 11. The two hundred seventy degree) (270°) configuration of the second bearing 274 can advantageously allow for larger linear tracks and linkages to increase stiffness and strength.

The third track 254 includes a third rail 278, a third pivot post 280, and a third track arm 282 extending forward of the third pivot post 280. The third pivot post 280 is arranged between the third track arm 282 and the third rail 278. The third track arm 282 provides a second flap segment mount 284 to which the second flap segment 134 can be mounted (see FIGS. 3 and 4). In one or more examples, as shown in FIG. 11, the third track arm 282 can be arranged as a clevis having a first prong and a second prong. The pin at the track-to-track pivot joint 272 can be received by the second bearing housing 276 as well as the first prong and the second prong of the third track arm 282. In this regard, the track-to-track pivot joint 272 can be a revolute or hinge joint.

Figure 12:
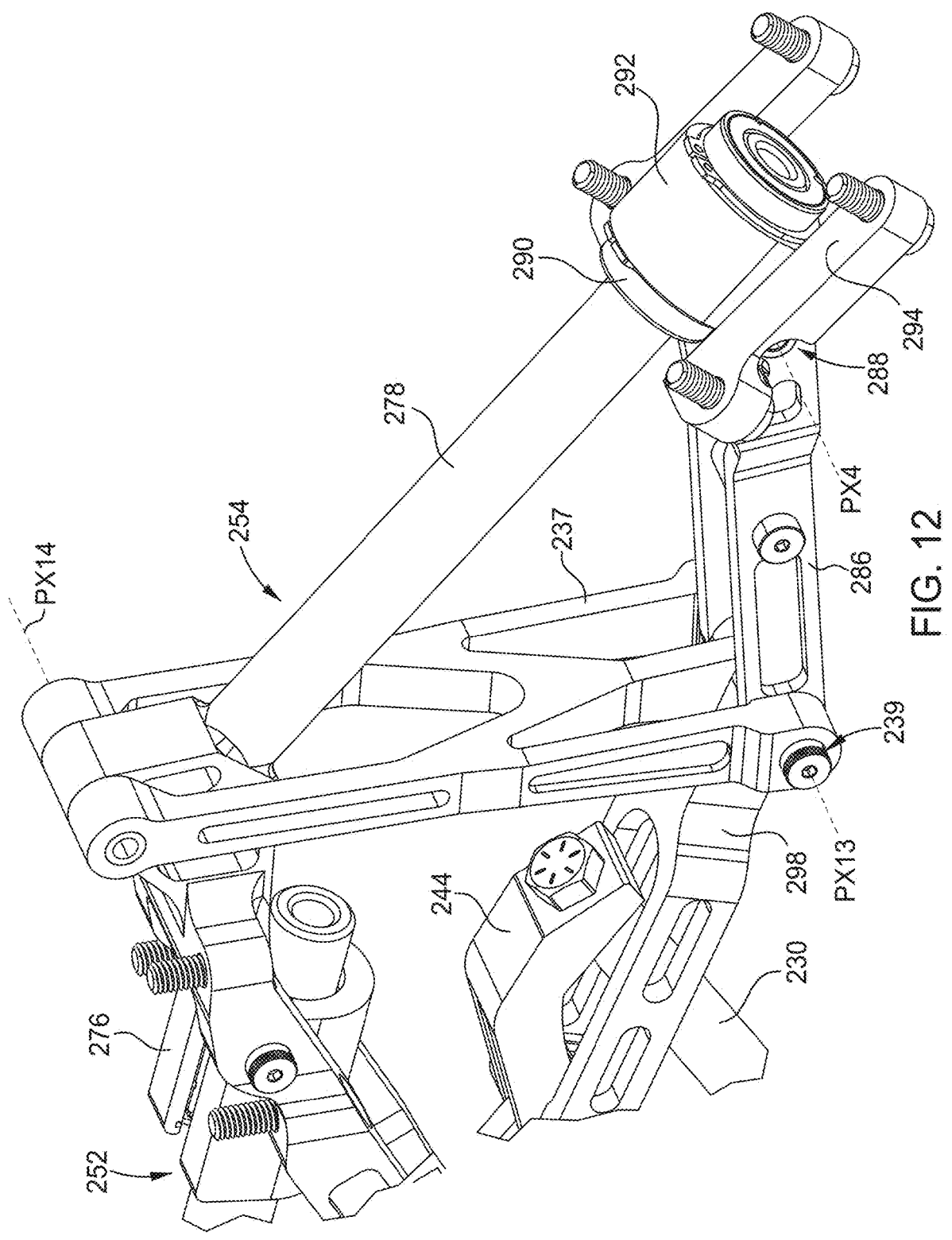
FIG. 12 is a close-up side perspective view of the flap drive mechanism of FIG. 3 detailing features of the third track.

The third track 254 is also pivotably coupled with a mounting link 286 at a track-to-link pivot joint 288, e.g., as shown in FIGS. 7 and 12. Accordingly, the third track 254 can be rotatable relative to the mounting link 286, e.g., about a movable pivot axis PX4 extending parallel to the Y-direction. The pivot axis PX4 is "movable" in the sense that the pivot axis PX4 is movable relative to the base mount 210. In at least one example, a third bearing 290, which is received by a third bearing housing 292, is slidable relative to the third rail 278. The third bearing housing 292 is pivotably coupled with the mounting link 286 at the track-to-link pivot joint 288, e.g., by way of a pin. In one or more examples, as shown in FIG. 12, the mounting link 286 can be arranged as a clevis having a first prong and a second prong. The pin at the track-to-link pivot joint 288 can be received by the third bearing housing 292 as well as the first prong and the second prong of the mounting link 286. In this regard, the track-to-link pivot joint 288 can be a revolute or hinge joint. Further, in at least one example, the third bearing 290 can be a three hundred sixty degree) (360°) bearing that wraps entirely around the third rail 278 of the third track 254. In other examples, the third bearing 290 can have another configuration. Also, the mounting link 286 provides a third flap segment mount 294 to which the third flap segment 136 can be mounted (see FIGS. 3 and 4).

The linkage system 246 includes a plurality of links, including drive links and support links that facilitate the deployment and retraction of the actuating flap 126. For instance, a first drive link 296 and a second drive link 298 are pivotably coupled with the drive clevis 244, e.g., at a drive link pivot joint 211 by a pin. Accordingly, the first drive link 296 and the second drive link 298 can each be arranged to pivot relative to the drive clevis 244, e.g., about a movable pivot axis PX5 extending parallel to the Y-direction (see also FIG. 9). The pivot axis PX5 is "movable" in the sense that the pivot axis PX5 is movable relative to the base mount 210. The drive link pivot joint 211 can be a revolute or hinge joint. The drive link pivot joint 211 (and consequently the movable pivot axis PX5) is kept forward of the distal end of the rod 230 along the X-direction throughout the range of motion between the stowed and deployed positions.

The first drive link 296 is pivotably coupled with the third track arm 282 of the third track 254 and a drivable link 213 at a track-to-triple link pivot joint 215 by a pin. Accordingly, the third track 254 and the drivable link 213 can be arranged to pivot relative to the first drive link 296, e.g., about a movable pivot axis PX6 extending parallel to the Y-direction (see also FIG. 10). The pivot axis PX6 is "movable" in the sense that the pivot axis PX6 is movable relative to the base mount 210. The track-to-triple link pivot joint 215 can be a revolute or hinge joint.

The drivable link 213 is pivotably coupled with a first connector link 217 at a first connector link pivot joint 219, e.g., by a pin. Also, the first connector link 217 is pivotably coupled with the first track arm 258 of the first track 250 at a first connector link-to-arm pivot joint 221, e.g., by a pin. In this way, the first connector link 217 can be arranged to pivot relative to the drivable link 213, e.g., about a movable pivot axis PX7 extending parallel to the Y-direction (see also FIG. 10). The pivot axis PX7 is "movable" in the sense that the pivot axis PX7 is movable relative to the base mount 210. The first connector link pivot joint 219 can be a revolute or hinge joint. Also, the first connector link 217 can be arranged to pivot relative to the first track arm 258, e.g., about a movable pivot axis PX8 extending parallel to the Y-direction (see also FIG. 10). The pivot axis PX8 is "movable" in the sense that the pivot axis PX8 is movable relative to the base mount 210. The first connector link-to-arm pivot joint 221 can be a revolute or hinge joint.

A second connector link 223 is pivotably coupled with the first connector link 217 at a second connector link pivot joint 225, e.g., by a pin. In this way, the second connector link 223 can be arranged to pivot relative to the first connector link 217, e.g., about a movable pivot axis PX9 extending parallel to the Y-direction (see also FIG. 10). The pivot axis PX9 is "movable" in the sense that the pivot axis PX9 is movable relative to the base mount 210. Also, the second connector link 223 is pivotably coupled with the second track arm 268 of the second track 252 at a second connector link-to-arm pivot joint 227, e.g., by a pin. Thus, the second connector link 223 can be arranged to pivot relative to the second track 252, e.g., about a movable pivot axis PX10 extending parallel to the Y-direction (see also FIG. 10). The pivot axis PX10 is "movable" in the sense that the pivot axis PX10 is movable relative to the base mount 210. The second connector link pivot joint 225 and the second connector link-to-arm pivot joint 227 can both be revolute or hinge joints.

A first support link 229 is pivotably coupled with the first drive link 296 at one end, e.g., at a first link-to-post pivot joint 231 by a pin. Thus, the first support link 229 can be arranged to pivot relative to the first drive link 296, e.g., about a movable pivot axis PX11 extending parallel to the Y-direction (see also FIG. 10). The pivot axis PX11 is "movable" in the sense that the pivot axis PX11 is movable relative to the base mount 210. The first support link 229 is also pivotably coupled with the first pivot post 260 at its other end, e.g., at the link-to-double track pivot joint 262. The first support link 229 can support the translation of the first track 250 and the second track 252 during deployment and retraction of the actuating flap 126. The first link-to-post pivot joint 231 can be a revolute or hinge joint.

A second support link 233 is pivotably coupled at one end with the first drive link 296, the third track arm 282, and the drivable link 213 at the track-to-triple link pivot joint 215. Accordingly, the second support link 233 can be arranged to pivot relative to the first drive link 296, the third track arm 282, and the drivable link 213, e.g., about the movable pivot axis PX6. The second support link 233 is pivotably coupled with the second pivot post 266 at its other end, e.g., at a second link-to-post pivot joint 235. Thus, the second support link 233 can be arranged to pivot relative to the second pivot post 266, e.g., about a movable pivot axis PX12 extending parallel to the Y-direction (see also FIG. 10). The pivot axis PX12 is "movable" in the sense that the pivot axis PX12 is movable relative to the base mount 210. The second support link 233 can support and constrain the pivot motion of the second track 252 during deployment and retraction of the actuating flap 126. The second link-to-post pivot joint 235 can be a revolute or hinge joint.

A third support link 237 is pivotably coupled at one end with the second drive link 298 and the mounting link 286 at a three-way link pivot joint 239. In this manner, the third support link 237 can be arranged to pivot relative to the second drive link 298 and the mounting link 286, e.g., about a movable pivot axis PX13 extending parallel to the Y-direction (see also FIG. 12). The pivot axis PX13 is "movable" in the sense that the pivot axis PX13 is movable relative to the base mount 210. The third support link 237 is pivotably coupled with the third pivot post 280 at its other end at a third link-to-post pivot joint 241. Thus, the third support link 237 can be arranged to pivot relative to the third pivot post 280, e.g., about a movable pivot axis PX14 extending parallel to the Y-direction (see also FIG. 12). The pivot axis PX14 is "movable" in the sense that the pivot axis PX14 is movable relative to the base mount 210. The third support link 237 can support and constrain the pivot motion of the third track 254 during deployment and retraction of the actuating flap 126. The three-way link pivot joint 239 and the third link-to-post pivot joint 241 can each be revolute or hinge joints.

The flap drive mechanism 200 can also include main rotating arms 243. The main rotating arms 243 can couple the base mount 210 with the second track 252. In one or more examples, the main rotating arms 243 can be pivotably coupled with the base mount 210 at their respective first ends at an arm-to-mount pivot joint 245. In this manner, the main rotating arms 243 can be arranged to pivot relative to the base mount 210, e.g., about a non-movable pivot axis PX15 extending parallel to the Y-direction. The pivot axis PX15 is "non-movable" in the sense that the pivot axis PX15 is fixed relative to the base mount 210. Also, the main rotating arms 243 can be pivotably coupled with the second track arm 268 of the second track 252 at their respective second ends at an arm-to-track pivot joint 247. Thus, the main rotating arms 243 can be arranged to pivot relative to the base mount 210, e.g., about a movable pivot axis PX16 extending parallel to the Y-direction. The pivot axis PX16 is "movable" in the sense that the pivot axis PX16 is movable relative to the base mount 210. The main rotating arms 243 can support and constrain the pivot motion of the second track 252 and the other components of the flap drive mechanism 200. The arm-to-mount pivot joint 245 and the arm-to-track pivot joint 247 can each be revolute or hinge joints.

With the architecture of the flap drive mechanism 200 described above, an example manner in which the flap drive mechanism 200 can move the actuating flap 126 from the stowed position to the deployed position will now be provided with reference to FIGS. 3 through 12.

To move the actuating flap 126 from the stowed position to the deployed position, electrical current is provided to the motor 226 of the actuator 224 so that the distal end of the rod 230 is extended away from the actuator housing 228, e.g., aft along the X-direction. In at least one example, the rod 230 can be extended away from the actuator housing 228 at a constant rate, which can provide a more consistent rate of change of lift. In at least one example, the rod 230 can be extended away from the actuator housing 228 at differing rates, such as at a first rate in a first time interval and at a second rate in a second time interval, with the first rate being a faster rate than the second rate. In this regard, the actuation can be slowed as the actuating flap 126 approaches the deployed position.

When the distal end of the rod 230 is extended away from the actuator housing 228, the actuator 224 pivots about the non-movable pivot axis PX1 by way of the spherical joint 242, e.g., so that the central axis AX1 of the actuator 224 makes a negative pitch angle with respect to the reference axis AX1 as shown in FIGS. 6 and 7. Further, the drive clevis 244 drives the first drive link 296 and the second drive link 298, which in turn drive the other links of the linkage system 246. As will be appreciated by comparing the position of the drive link pivot joint 211 in FIGS. 5 6, and 7, the drive link pivot joint 211 is moved aft and downward away from the actuator housing 228, e.g., along the X-direction and the Z-direction. This causes the first drive link 296 and the first support link 229 to "pull out" the first track 250 aft along the X-direction. Thus, the first rail 256 translates or slides aft relative to the first forward bearing 220 and the first aft bearing 222 along the X-direction. This translational motion also drives the second track 252 and the third track 254 aft along the X-direction. The drivable link 213, the first connector link 217, and the second connector link 223, as well as the first pivot post 260 and the first support link 229 at the link-to-double track pivot joint 262, support and guide the pivot movement of the second track 252 relative to the first track 250. The second ends of the main rotating arms 243 pitch upward such that the arm-to-track pivot joint 247 (and consequently the moveable pitch axis PX16) is moved aft and upwards, constraining the pivot movement of the second track 252. The second support link 233 also guides and constrains the pivot movement of the second track 252. The movement of the third track 254 relative to the second track 252 causes sliding of the second bearing 274 relative to the second rail 264 (i.e., the sliding action of the second bearing 274 away from the second pivot post 266). In addition, the second drive link 298 drives the three-way link pivot joint 239 aft and downward, which facilitates sliding of the third bearing 290 relative to the third rail 278 (i.e., the sliding action of the third bearing 290 away from the third pivot post 280). The pivot movement of the third track 254 is guided and constrained by the third support link 237, the pivot coupling at the track-to-track pivot joint 272, and the pivot coupling at the triple link pivot joint 215. The pivot coupling at the track-to-link pivot joint 288 allows the third bearing housing 292 to pivot relative to the mounting link 286, which can enable smooth translational motion or sliding of the third bearing 290 relative to the third rail 278.

Accordingly, when the rod 230 is extended away from the actuator housing 228, the linkage system 246 drives the first rail 256 of the first track 250 to translate aft along the X-direction, causing the second track 252 to pivot downward and the second bearing 274 to slide relative to the second rail 264, and so that the third track 254 pivots downward and the third bearing 290 slides relative to the third rail 278. The links of the linkage system 246 pivot about their respective pivot axes to facilitate and guide the second and third bearings 274, 290 so that the actuating flap 126 can reach the deployed position.

An example manner in which the flap drive mechanism 200 moves the actuating flap from the deployed position to the stowed position will now be provided with reference to FIGS. 3 through 12.

To move the actuating flap 126 from the deployed position to the stowed position, electrical current is provided to the motor 226 of the actuator 224 so that the distal end of the rod 230 is moved toward or retracted into the actuator housing 228. In at least one example, the rod 230 can be retracted into the actuator housing 228 at a constant rate, which can provide a more consistent rate of change of lift. In at least one example, the rod 230 can be retracted into the actuator housing 228 at differing rates, such as at a first rate in a first time interval and at a second rate in a second time interval, with the first rate being a faster rate than the second rate. In this regard, the actuation can be slowed as the actuating flap 126 approaches the stowed position.

When the rod 230 is retracted into the actuator housing 228, the actuator 224 pivots about the non-movable pivot axis PX1 by way of the spherical joint 242, e.g., so that the central axis AX1 of the actuator 224 makes a less negative pitch angle with respect to the reference axis AX1 and eventually a positive pitch angle as shown in FIG. 5. Further, the drive clevis 244 drives the first drive link 296 and the second drive link 298, which in turn drive the other links of the linkage system 246. As will be appreciated by comparing the position of the drive link pivot joint 211 in FIGS. 5 6, and 7, the drive link pivot joint 211 is moved forward and upward toward the actuator housing 228, e.g., along the X-direction and the Z-direction. This causes the first drive link 296 and the first support link 229 to "pull in" the first track 250 forward along the X-direction. Thus, the first rail 256 translates or slides forward relative to the first forward bearing 220 and the first aft bearing 222 along the X-direction. This translational motion also drives the second track 252 and the third track 254 forward along the X-direction. The drivable link 213, the first connector link 217, and the second connector link 223, as well as the first pivot post 260 and the first support link 229 at the link-to-double track pivot joint 262, support and guide the pivot movement of the second track 252 relative to the first track 250, e.g., in a generally upward and forward direction. The second ends of the main rotating arms 243 pitch downward such that the arm-to-track pivot joint 247 (and consequently the moveable pitch axis PX16) is moved forward and downwards, constraining the pivot movement of the second track 252. The second support link 233 also guides and constrains the pivot movement of the second track 252. The movement of the third track 254 relative to the second track 252 causes sliding of the second bearing 274 relative to the second rail 264 (i.e., the sliding action of the second bearing 274 toward the second pivot post 266). Moreover, the second drive link 298 drives the three-way link pivot joint 239 forward and upward, which facilitates sliding of the third bearing 290 relative to the third rail 278 (i.e., the sliding action of the third bearing 290 toward the third pivot post 280). The pivot movement of the third track 254 is guided and constrained by the third support link 237, the pivot coupling at the track-to-track pivot joint 272, and the pivot coupling at the triple link pivot joint 215. The pivot coupling at the track-to-link pivot joint 288 allows the third bearing housing 292 to pivot relative to the mounting link 286, which can enable smooth sliding action of the third bearing 290 relative to the third rail 278.

Accordingly, when the rod 230 is retracted into the actuator housing 228, the linkage system 246 drives the first rail 256 of the first track 250 to translate forward along the X-direction, causing the aft end of the second track 252 to pivot upward and the second bearing 274 to slide relative to the second rail 264, and so that the aft end of the third track 254 pivots upward and the third bearing 290 slides relative to the third rail 278. The links of the linkage system 246 pivot about their respective pivot axes to facilitate and guide the second and third bearings 274, 290 so that the actuating flap 126 can reach the stowed position.

Figure 13:
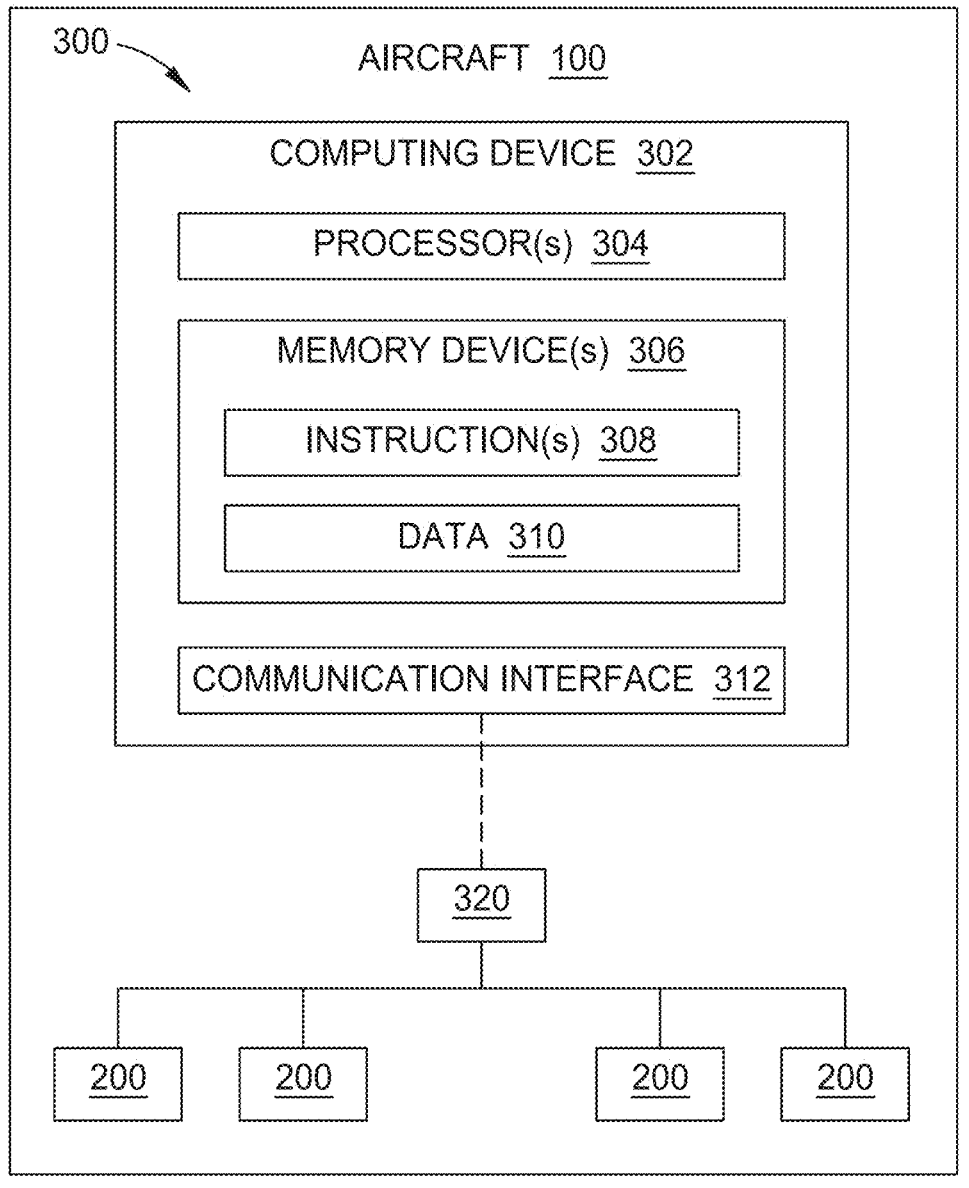
FIG. 13 is a block diagram of a computing system for the aircraft of FIG. 1, according to one or more aspects of the present disclosure.

FIG. 13 is a block diagram of a computing system 300 for the aircraft 100. As shown in FIG. 13, the computing system 300 can include a controller or computing device 302. The computing device 302 can include one or more processor(s) 304 and one or more memory device(s) 306. The one or more processor(s) 304 can include any suitable processing device, such as a microprocessor, microcontroller, integrated circuit, logic device, or other suitable processing device. The one or more memory device(s) 306 can include one or more computer-readable medium, including, but not limited to, non-transitory computer-readable medium, RAM, ROM, hard drives, flash drives, and other memory devices.

The one or more memory device(s) 306 can store information accessible by the one or more processor(s) 304, including computer-readable instructions 308 or computer-readable program code that can be executed by the one or more processor(s) 304. The instructions 308 can be any set of instructions that when executed by the one or more processor(s) 304, cause the one or more processor(s) 304 to perform operations, such as operations associated with controlling one or more flap drive mechanisms to move an actuating flap from a stowed position to a deployed position, or vice versa. The instructions 308 can be software written in any suitable programming language or can be implemented in hardware.

The memory device(s) 306 can further store data 310 that can be accessed by the processor(s) 304. For example, the data 310 can include any of the data noted herein. The data 310 can include one or more table(s), function(s), algorithm(s), model(s), equation(s), libraries, etc. according to example aspects of the present disclosure.

The computing device 302 can also include a communication interface 312 used to communicate, for example, with the other components of the aircraft. The communication interface 312 can include any suitable components for interfacing with one or more network(s), including for example, transmitters, receivers, ports, controllers, antennas, or other suitable components.

In one or more examples, as shown in FIG. 13, the computing device 302 can be communicatively coupled with a power supply 320 (by one or more wired or wireless communication links), or rather, a controller thereof. The power supply 320 can be electrically coupled with one or more flap drive mechanisms 200 of the aircraft 100. Particularly, the electric motor of each flap drive mechanism 200 can be electrically coupled with the power supply 320. The computing device 302 can send control signals to the power supply 320, which can control the voltage of the power supply 320 and thus the electrical power provided to the flap drive mechanisms 200.

In at least one example, the computing device 302 can control the power supply 320 so that the flap drive mechanisms 200 move the actuating flaps in synchronization, e.g., across both or multiple wings, so as to change the lift of the aircraft 100 in a controlled manner. For instance, the actuating flaps 126 on both forward wings 114 (FIG. 1) can be deployed and or retracted in synchronization as controlled by the computing device 302.

In one or more examples, the flap drive mechanisms 200 associated with one wing can be controlled independently of the flap drive mechanisms 200 associated with another wing. For instance, a first wing can have two (2) associated flap drive mechanisms 200 for moving a first actuating flap, and a second wing opposite the first wing can have two (2) associated flap drive mechanisms 200 for moving a second actuating flap. In at least one example, the computing device 302 can control the flap drive mechanisms 200 associated with the first wing to move the first actuating flap to a fully deployed or partially deployed position while controlling the flap drive mechanisms 200 associated with the second wing to move the second actuating flap to a position different than the position of the first actuating flap, e.g., to act as ailerons to produce a roll maneuver, to provide trim, to prevent drift during a crosswind, to stabilize the aircraft during vertical and/or hover flight, etc. Accordingly, the actuating flaps can be controlled during vertical and hover flight, as well as horizontal flight, to provide aircraft control.

FIG. 14 is a flow diagram for a method 400 according to one or more aspects of the present disclosure.

At 402, the method 400 can include providing an aircraft having a wing that includes a main airfoil, an actuating flap, and a flap drive mechanism coupled with the main airfoil and arranged to move the actuating flap between a stowed position and a deployed position. The flap drive mechanism can include a base mount coupled with the main airfoil; a first track having a first rail; a second track pivotably coupled with the first track and having a second rail and a mount for a first flap segment of the actuating flap; a third track pivotably coupled with the second track and having a third rail and a mount for a second flap segment of the actuating flap; a plurality of links, including a mounting link that has a mount for a third flap segment of the actuating flap; and an actuator. In at least one example, actuator can be pivotably coupled with the base mount. In at least one example, when the actuating flap is in the deployed position, a chord of the third flap segment can be substantially vertical (i.e., within ten percent (10%) of a vertical direction), whereas, when the actuating flap is in the stowed position, the chord of the third flap segment can be substantially horizontal (i.e., within ten percent (10%) of a plane that is perpendicular to the vertical direction). In at least one example, the third flap segment is rotated by at least ninety degrees) (90°) when the actuating flap is moved from the stowed position to the deployed position, or vice versa.

At 404, the method 400 can include moving the actuating flap using the flap drive mechanism by driving the plurality of links with the actuator so that the first rail translates relative to the base mount, the second track pivots relative to the first track while a bearing coupled with the third track slides relative to the second rail, and the third track pivots relative to the second track while a bearing coupled with the mounting link slides relative to the third track. In at least one example, the bearing coupled with the third track is carried by a second bearing housing that is pivotably coupled with the third track. In at least one example, the bearing coupled with the mounting link is carried by a third bearing housing that is pivotably coupled with the mounting link.

With reference now to FIG. 15 and FIGS. 3 through 7, FIG. 15 is a graph 500 depicting flap motion of each of the three flap segments of the actuating flap 126, as described herein, as a function of actuator motion, or rather, the stroke of the rod 230 of the actuator 224. In FIG. 15, the function associated with the first flap segment 132 is labeled as "Flap 1", the function associated with the second flap segment 134 is labeled as "Flap 2", and the function associated with the third flap segment 136 is labeled as "Flap 3". Moreover, in FIG. 15, the actuator motion at 0.0 represents the fully extended position of the rod 230 of the actuator 224 (e.g., its position in FIGS. 3 and 7) and the actuator motion at 1.0 represents the fully retracted position of the rod 230 of the actuator 224 (e.g., its position in FIGS. 4 and 5). Also, in FIG. 15, the flap motion at 0.0 represents the given flap segment in the deployed position and the flap motion at 1.0 represents the given flap segment in the stowed position.

As illustrated in FIG. 15, from 0.0 to 0.2 of the actuator motion (i.e., when the rod 230 is in the fully extended position and begins to retract), Flap 1 begins traveling along its travel path from its deployed position toward its stowed position at a relatively constant rate. Flap 2 begins traveling along its travel path from its deployed position toward its stowed position by experiencing initial fast motion and subsequent leveling off. Flap 1 and Flap 2 travel roughly 10% along their respective travel paths from 0.0 to 0.2 of actuation motion. However, Flap 3 begins traveling along its travel path from its deployed position toward its stowed position with relatively fast motion (almost 2.5 times the motion of Flap 1), but then starts to level off at the actuator motion of 0.2.

From 0.2 to 0.4 of the actuator motion, with the rod 230 continuing to retract, Flap 1 and Flap 2 each have relatively constant rate of travel while the motion of Flap 3 stagnates during this period. From 0.4 to 1.0 of actuator motion, Flap 1, Flap 2, and Flap 3 each travel along their respective paths at a relatively constant rates, with Flap 3 having the slowest rate of travel, Flap 2 having the fastest rate of travel, and Flap 1 having a rate of travel between the rates of Flap 2 and Flap 3. At 1.0 of actuator motion, Flap 1, Flap 2, and Flap 3 have made it to their respective stowed positions (as represented by 1.0 of flap motion).

In at least one aspect, an aircraft is provided. The aircraft includes a wing having a main airfoil and an actuating flap having a plurality of flap segments, including a trailing flap segment. The aircraft includes a means (e.g., a flap drive mechanism) for moving the actuating flap so that: when a rod of an actuator goes from 100% of its stroke to 80% of its stroke (i.e., from 0.0 to 0.2 of the actuator motion in FIG. 15), the trailing flap segment travels along at least 40% of its travel path (i.e., from at least 0.0 to 0.4 of flap motion in FIG. 15), with the travel path being defined by a path of travel of the trailing flap segment from its fully deployed position to its stowed position, and when the rod goes from 20% of its stroke to 0% of its stroke (i.e., from 0.8 to 1.0 of the actuator motion in FIG. 15), the trailing flap segment travels along less than 20% of its travel path (i.e., less than 0.2 of flap motion in FIG. 15). 100% of the stroke of the rod corresponds to a fully extended position of the rod, while 0% of the stroke of the rod corresponds to a fully retracted position of the rod.

In at least one aspect, an aircraft is provided. The aircraft includes a wing having a main airfoil and an actuating flap having a plurality of flap segments, including a leading flap segment and a trailing flap segment. The aircraft includes a means (e.g., a flap drive mechanism) for moving the actuating flap so that: when a rod of an actuator goes from 100% of its stroke to 80% of its stroke (i.e., from 0.0 to 0.2 of the actuator motion in FIG. 15), the trailing flap segment travels along at least 40% of a trailing flap travel path (i.e., from at least 0.0 to 0.4 of flap motion in FIG. 15), with the trailing flap path extending between a fully deployed position and a stowed position of the trailing flap segment, and the leading flap segment travels along less than 20% of a leading flap travel path (i.e., less than 0.2 of flap motion in FIG. 15), with the leading flap path extending between a fully deployed position and a stowed position of the leading flap segment.

Words of approximation, such as "about" and "substantially", may each be used herein in the sense of "at, near, or nearly at," or "within 10% of a stated value," or "within acceptable manufacturing tolerances," or any logical combination thereof, unless otherwise noted herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In view of the foregoing, the scope of the present disclosure is determined by the claims that follow.

We claim:

1. A flap drive mechanism for moving an actuating flap of an aircraft, the flap drive mechanism comprising:
   a base mount;
   a first track having a first rail;
   a second track pivotably coupled with the first track and having a second rail and a mount for a first flap segment of the actuating flap;
   a third track pivotably coupled with the second track and having a third rail and a mount for a second flap segment of the actuating flap;
   a plurality of links, including a mounting link that has a mount for a third flap segment of the actuating flap; and
   an actuator coupled with the base mount and arranged to drive the plurality of links so that the first rail translates relative to the base mount, the second track pivots relative to the first track while a bearing coupled with the third track slides relative to the second rail, and the third track pivots relative to the second track while a bearing coupled with the mounting link slides relative to the third track.

2. The flap drive mechanism of claim 1, wherein the base mount has a first forward bearing housing carrying a first forward bearing and a first aft bearing housing carrying a first aft bearing, and wherein the first rail is received by, and translatable relative to, the first forward bearing and the first aft bearing.

3. The flap drive mechanism of claim 1, further comprising:
   a second bearing housing carrying the bearing coupled with the third track, wherein the second bearing housing is pivotably coupled with the third track.

4. The flap drive mechanism of claim 1, further comprising:
   a third bearing housing carrying the bearing coupled with the mounting link, wherein the third bearing housing is pivotably coupled with the mounting link.

5. The flap drive mechanism of claim 1, wherein the first track has a first track arm extending from the first rail and a first pivot post extending upward from the first track arm, and wherein the second track is pivotably coupled with the first track at the first pivot post.

6. The flap drive mechanism of claim 1, further comprising:
   a main rotating arm having a first end and a second end, and wherein the first end is pivotably coupled with the base mount and the second end is pivotably coupled with the second track.

7. The flap drive mechanism of claim 1, wherein the actuator has an actuator housing and a rod translatable relative to the actuator housing, and wherein the flap drive mechanism further comprises:

a drive clevis coupled with the rod, wherein the plurality of links include a first drive link and a second drive link each pivotably coupled with the drive clevis at a drive link pivot joint.

8. The flap drive mechanism of claim 7, wherein the first track has a first track arm extending from the first rail and a first pivot post extending upward from the first track arm, and wherein the plurality of links include a first support link having a first end pivotably coupled with the first drive link and a second end pivotably coupled with the first pivot post and the second track at a pivot joint.

9. The flap drive mechanism of claim 7, wherein the second track has a second track arm and a second pivot post extending upward from the second rail and the second track arm, and wherein the plurality of links include a second support link having a first end and a second end, and wherein the first end of the second support link is pivotably coupled with the first drive link and the third track at a pivot joint, and the second end of the second support link is pivotably coupled with the second pivot post.

10. The flap drive mechanism of claim 9, wherein the plurality of links include a drivable link, a first connector link, and a second connector link, and wherein:

the drivable link is pivotably coupled with the first end of the second support link, the first drive link, and the third track at the pivot joint, the first connector link has a first end pivotably coupled with the drivable link and a second end pivotably coupled with the first track, and the second connector link has a first end pivotably coupled with the second connector link and a second end pivotably coupled with the second track.

11. The flap drive mechanism of claim 7, wherein the third track has a third track arm and a third pivot post arranged between the third rail and the third track arm, and wherein the plurality of links include a third support link having a first end and a second end, and wherein the first end of the third support link is pivotably coupled with the second drive link and the mounting link at a three-way link pivot joint, and the second end of the third support link is pivotably coupled with the third pivot post.

12. The flap drive mechanism of claim 11, wherein the actuating flap is movable between a stowed position and a deployed position, and wherein:

when the actuating flap is in the stowed position, the three-way link pivot joint is arranged above a rod of the actuator, and when the actuating flap is in the deployed position, the three-way link pivot joint is arranged below the rod.

13. The flap drive mechanism of claim 1, wherein the actuator is pivotably coupled with the base mount.

14. The flap drive mechanism of claim 13, wherein the actuator is pivotable such that i) a central axis of the actuator has a positive pitch angle relative to a reference axis when the actuating flap is in a stowed position, and ii) the central axis of the actuator has a negative pitch angle relative to the reference axis when the actuating flap is in a deployed position.

15. An aircraft, comprising:

a wing having a main airfoil and an actuating flap; and a flap drive mechanism coupled with the main airfoil and arranged to move the actuating flap between a stowed position and a deployed position, the flap drive mechanism comprising:

a base mount coupled with the main airfoil;

a first track having a first rail;

a second track pivotably coupled with the first track and having a second rail and a mount for a first flap segment of the actuating flap;

a third track pivotably coupled with the second track and having a third rail and a mount for a second flap segment of the actuating flap;

a plurality of links, including a mounting link that has a mount for a third flap segment of the actuating flap; and an actuator coupled with the base mount and arranged to drive the plurality of links so that the first rail translates relative to the base mount, the second track pivots relative to the first track while a bearing coupled with the third track slides relative to the second rail, and the third track pivots relative to the second track while a bearing coupled with the mounting link slides relative to the third track.

16. The aircraft of claim 15, wherein the flap drive mechanism is a first flap drive mechanism, and wherein the aircraft further comprises:

a second flap drive mechanism arranged to move the actuating flap, and wherein the first flap drive mechanism is arranged at a first distance from a root of the wing and the second flap drive mechanism is arranged at a second distance from the root such that the first flap drive mechanism and the second flap drive mechanism cancel out of plane bending loads in at least on flight mode of the aircraft.

17. The aircraft of claim 15, wherein, when the actuating flap is in the stowed position, the first flap segment, the second flap segment, and the third flap segment collectively form at least fifty percent of a bottom side of the wing, with the bottom side extending from a leading edge of the main airfoil to a trailing edge of the third flap segment.

18. The aircraft of claim 15, wherein the actuator has an actuator housing and a rod translatable relative to the actuator housing, and wherein the rod is coupled with one or more links at a drive point, and wherein, when the actuating flap is in the stowed position, the drive point is substantially aligned with a center of pressure of the wing along a forward-to-aft direction of the wing.

19. The aircraft of claim 15, wherein the wing is a forward wing, and wherein the aircraft further comprises:

a forward thrustor statically fixed to the forward wing and positioned in front of the actuating flap, the forward thrustor having a substantially horizontal rotation axis;

an aft wing arranged aft of the forward wing; and an aft thrustor statically fixed to the aft wing and having a substantially vertical rotation axis.

20. A method, comprising:

providing an aircraft having a wing that includes a main airfoil, an actuating flap, and a flap drive mechanism coupled with the main airfoil and arranged to move the actuating flap between a stowed position and a deployed position, the flap drive mechanism comprises:

a base mount coupled with the main airfoil;

a first track having a first rail;

a second track pivotably coupled with the first track and having a second rail and a mount for a first flap segment of the actuating flap;

a third track pivotably coupled with the second track and having a third rail and a mount for a second flap segment of the actuating flap;

a plurality of links, including a mounting link that has a mount for a third flap segment of the actuating flap; and an actuator; and moving the actuating flap using the flap drive mechanism by driving the plurality of links with the actuator so that the first rail translates relative to the base mount, the second track pivots relative to the first track while a bearing coupled with the third track slides relative to the second rail, and the third track pivots relative to the second track while a bearing coupled with the mounting link slides relative to the third track.

* * * * *